(12) United States Patent
Anand et al.

(10) Patent No.: US 11,844,042 B2
(45) Date of Patent: Dec. 12, 2023

(54) CUSTOMIZING USER EXPERIENCES BASED ON TRANSPORTATION IRREGULARITIES

(71) Applicant: Lyft, Inc., San Francisco, CA (US)

(72) Inventors: Preet Singh Anand, Oakland, CA (US); Rohan Ramkrishna Dhaimade, San Francisco, CA (US); Alyssa Michelle Hitchcock, Bozeman, MT (US); Andrew Li, San Francisco, CA (US); Alexandra Elizabeth Michaelides, San Francisco, CA (US); Kimberley Eileen O'Rourke, San Francisco, CA (US); Prachi Sharma, Saratoga, CA (US); Naomi Yarin, Oakland, CA (US)

(73) Assignee: Lyft, Inc., San Francisco, CA (US)

(*) Notice: Subject to any disclaimer, the term of this patent is extended or adjusted under 35 U.S.C. 154(b) by 225 days.

(21) Appl. No.: 17/127,334

(22) Filed: Dec. 18, 2020

(65) Prior Publication Data
US 2021/0219257 A1 Jul. 15, 2021

Related U.S. Application Data

(60) Provisional application No. 62/961,136, filed on Jan. 14, 2020.

(51) Int. Cl.
| | |
|---|---|
| *H04W 64/00* | (2009.01) |
| *G08G 1/00* | (2006.01) |
| *H04W 4/40* | (2018.01) |
| *H04W 84/04* | (2009.01) |

(52) U.S. Cl.
CPC .......... *H04W 64/003* (2013.01); *G08G 1/202* (2013.01); *H04W 4/40* (2018.02); *H04W 64/006* (2013.01); *H04W 84/04* (2013.01)

(58) Field of Classification Search
CPC ... H04W 64/003; H04W 64/006; H04W 4/40; H04W 4/90; H04W 4/029; H04W 84/04; G08G 1/202
See application file for complete search history.

(56) References Cited

U.S. PATENT DOCUMENTS

| | | | |
|---|---|---|---|
| 10,720,050 B2 | 7/2020 | Jeon | |
| 2015/0289122 A1* | 10/2015 | Friesen | H04W 4/90 |
| | | | 455/404.2 |
| 2017/0245130 A1* | 8/2017 | Mehta | G10L 15/22 |

(Continued)

FOREIGN PATENT DOCUMENTS

FR 3033149 A1 * 9/2016 ............ B60K 28/06

*Primary Examiner* — Farid Seyedvosoghi
(74) *Attorney, Agent, or Firm* — Keller Preece PLLC

(57) ABSTRACT

The present disclosure relates to systems, non-transitory computer-readable media, and methods for automatically addressing emergency situations, customizing emergency user interfaces and options, and managing emergency communications. In particular, in one or more embodiments, the disclosed systems detect a transportation irregularity and generate an emergency assistance user interface based on an emergency severity associated with the transportation irregularity. Based on user interactions with the generated emergency assistance user interface, the disclosed systems generate and send an emergency communication to a remote third-party system.

20 Claims, 23 Drawing Sheets

(56) References Cited

U.S. PATENT DOCUMENTS

2019/0027017 A1\* 1/2019 Smith .................. G08B 27/006
2019/0129438 A1\* 5/2019 Morita ............... G01C 21/3623
2020/0247430 A1\* 8/2020 Rao ........................ B60K 35/00

\* cited by examiner

Unexpected Drop Off

Long Drop Off

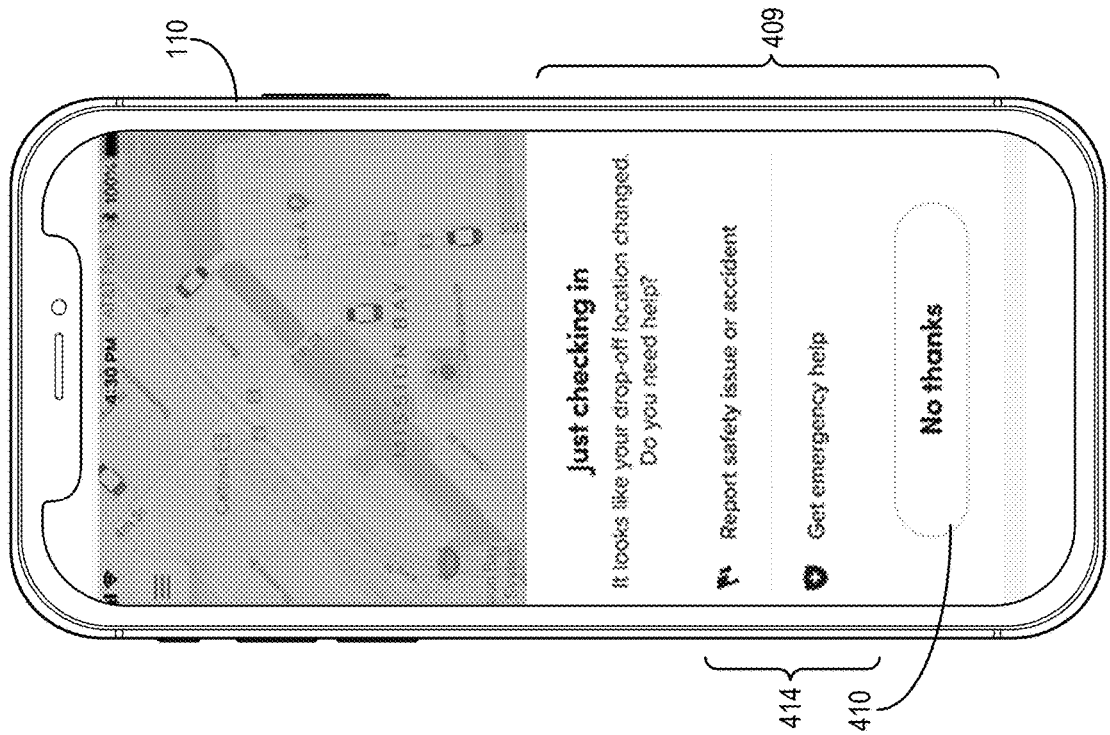
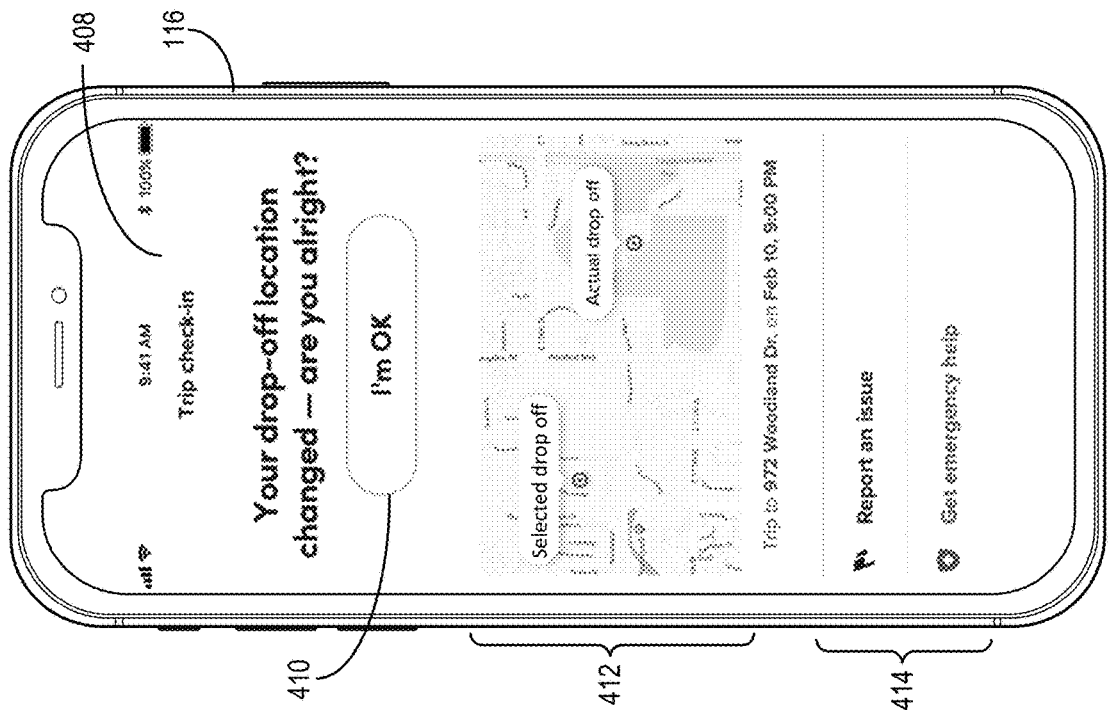
Fig. 4C
Fig. 4D

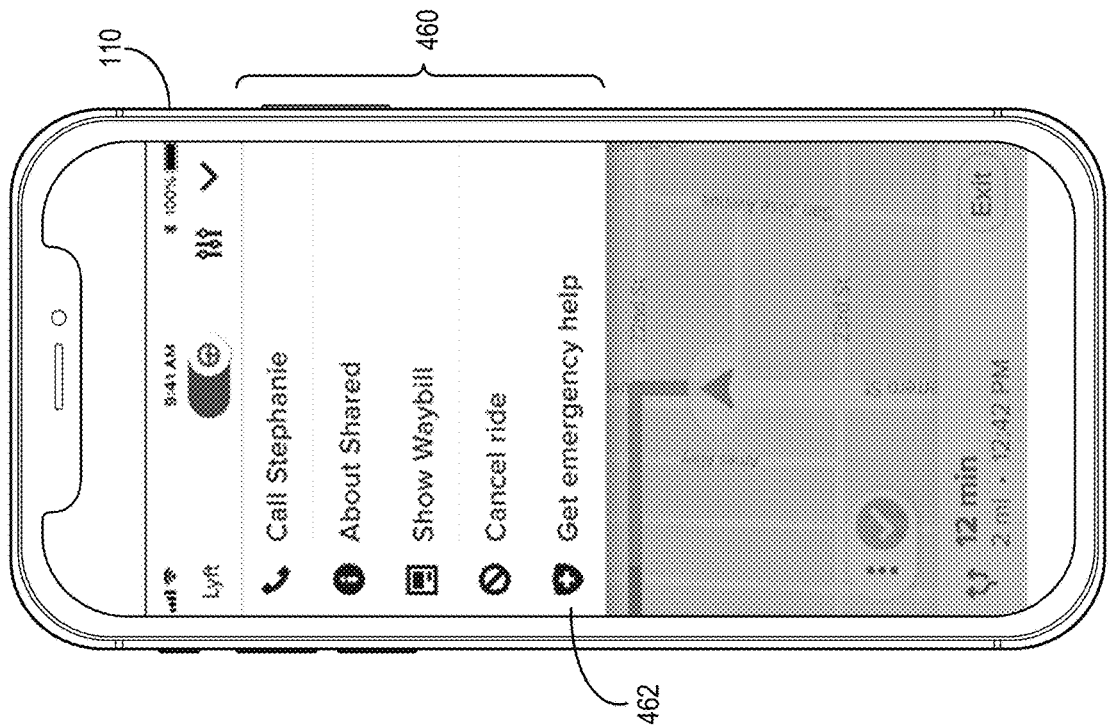
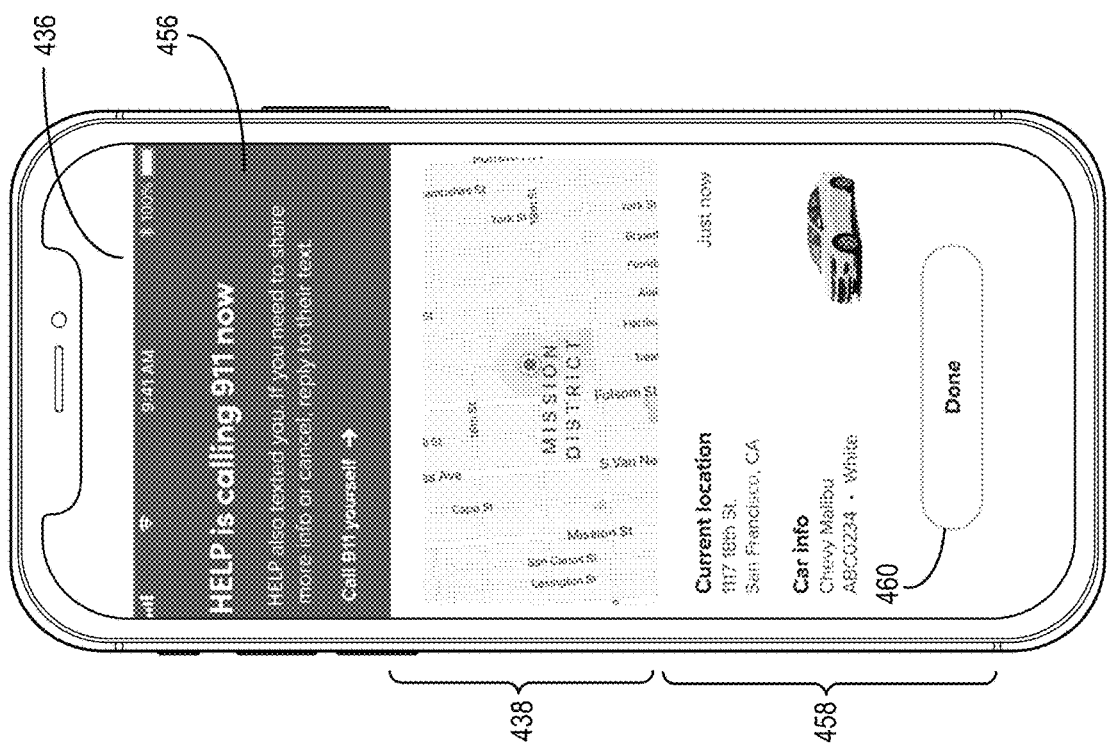
Fig. 5H
Fig. 5G

CUSTOMIZING USER EXPERIENCES BASED ON TRANSPORTATION IRREGULARITIES

CROSS-REFERENCE TO RELATED APPLICATIONS

This application claims priority to and the benefit of U.S. Provisional Patent Application No. 62/961,136, filed Jan. 14, 2020, which is incorporated herein by reference in its entirety.

BACKGROUND

Recent years have seen significant improvements in transportation matching systems. For example, conventional systems can match providers and requestors in order to fulfill transportation requests. To illustrate, conventional systems can provide features that enable 1) requestors to configure transportation requests, and 2) providers to accept transportation matches and pickup matched requestors in order to fulfill transportation requests. Occasionally, safety concerns arise prior to, during, or after transportation for both requestors and providers. Conventional systems generally provide access to publicly available emergency resources (e.g., dialing 911) such that a requestor or provider can request help in an emergency situation.

Although conventional systems provide limited access to publicly available emergency resources, conventional systems are often inaccurate, inefficient, and inflexible because they rely on these one-size-fits-all emergency resources. For example, conventional systems are inaccurate because they rely on dated 911 technology that only leverage audio phone calls. For instance, when a user selects an option via a conventional system that triggers a 911 call, the 911 dispatcher cannot send help unless the user can verbally confirm their location and other details of their situation.

Additionally, conventional systems are inefficient because they waste computing resources in providing ineffective emergency resources. For example, as mentioned above, conventional systems are tied to dated 911 technology. This 911 technology, however, relies on a user being able to 1) speak out loud, 2) describe his or her transportation vehicle, and 3) pinpoint his or her current location. If the user cannot provide this information, the 911 resources fail and the resources utilized in connecting the user to the 911 dispatcher via a conventional system are wasted. Furthermore, conventional emergency user interfaces and options for accessing emergency services are static and cumbersome, making it difficult and inefficient to access emergency assistance when needed.

Moreover, conventional systems are inflexible because they function in connection with only one type of communication. For example, as mentioned above, conventional systems generally operate in connection with 911 technology. This technology is inflexibly based on audio phone calls initiated by a user. As such, a user who may not be in a position to make the call and speak (e.g., due to an escalating situation with another person within an enclosed space, such as a car) would find it difficult to request help via the options presented by a conventional system.

These along with additional problems and issues exist with regard to conventional systems.

SUMMARY

This disclosure describes embodiments of systems, non-transitory computer-readable media, and methods that solve the foregoing problems in addition to providing other benefits. In particular, the disclosed systems provide users with options for silently and discretely customizing user interfaces for accessing emergency assistance based on the specific information associated with an emergency situation. For example, disclosed systems determine an emergency severity associated with a transportation irregularity, and customize emergency options within a user interface and communicate information to a third-party emergency service system based on the determined severity and specific information associated with the transportation irregularity. By detecting and analyzing emergency signals associated with a transportation irregularity, the disclosed systems can provide relevant information to responders without requiring a requestor or provider to conduct an actual 911 call. As such, the disclosed systems effectively mitigate or entirely prevent safety incidents by ensuring requestors and providers get fast and accurate emergency responses in an efficient manner with little to no user interaction required.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 4A-4E illustrate example push notifications and graphical user interfaces generated by the emergency system in accordance with one or more embodiments.

DETAILED DESCRIPTION

Figure 1:
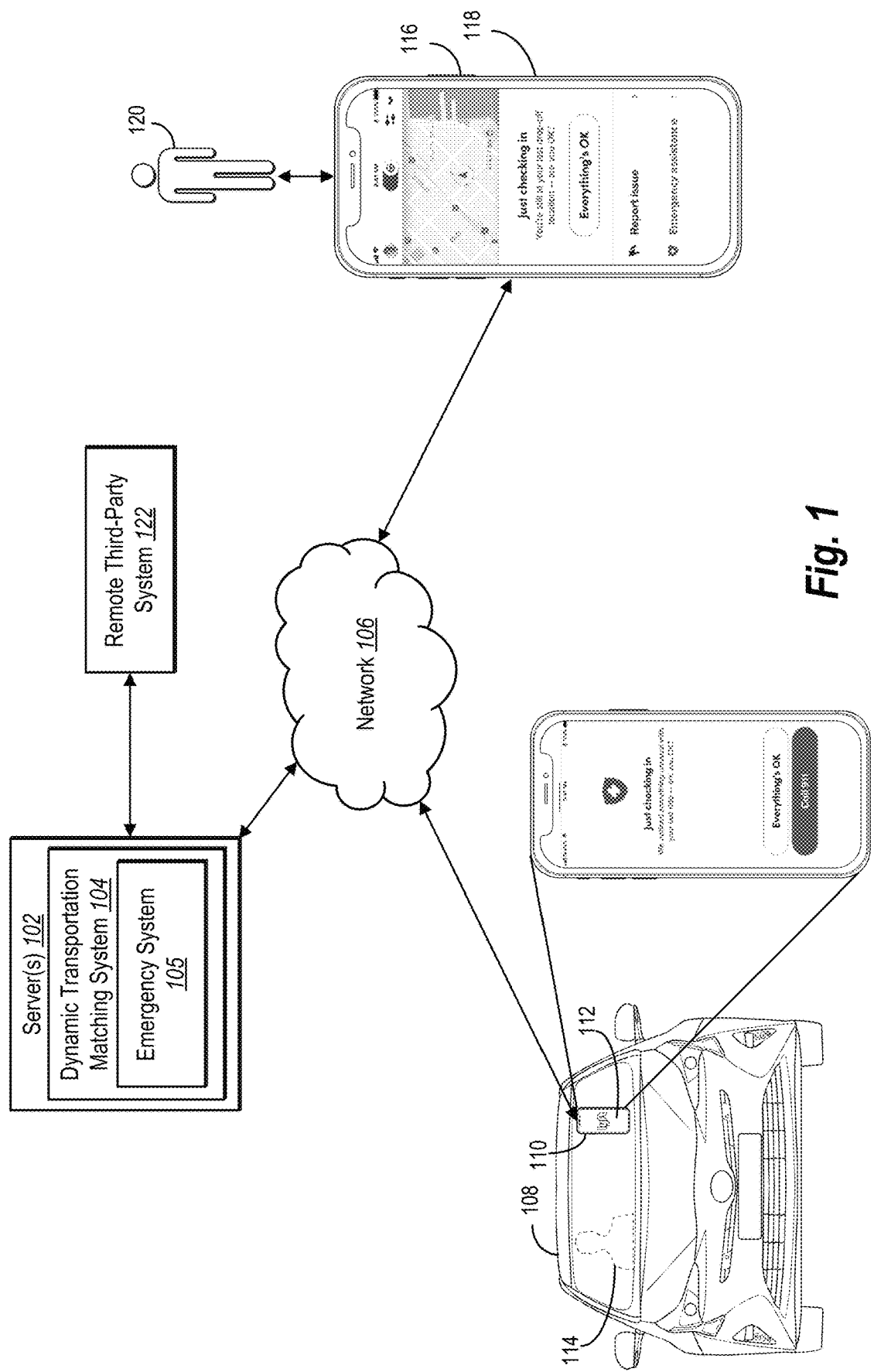
FIG. 1 illustrates an example environment in which a dynamic transportation matching system and an emergency system operate in accordance with one or more embodiments.

This disclosure describes one or more embodiments of an emergency system that intelligently detects a transportation irregularity relative to an ongoing or recently ended transportation of a user in order to provide emergency response options to the user and/or to contact third-party emergency service providers on the user's behalf. For example, in some embodiments, the emergency system detects and analyzes various transportation signals from mobile devices associated with transportation in order to determine a likelihood that a transportation irregularity (e.g., an emergency situation) is occurring and a corresponding severity of the transportation irregularity. In response to determining with a high confidence that a transportation irregularity is occurring, the emergency system can provide an emergency assistance user interface for a user (e.g., a requestor or a provider) in a customized manner based on the severity level associated with transportation irregularity. Based on how the user interacts with the emergency assistance user interface, the emergency system can generate and send an emergency communication to a third-party emergency service provider and establish a communication session with the third-party emergency service provider for further monitoring and communication. In one or more embodiments, the emergency communication system can escalate communication associated with a transportation irregularity at a predetermined severity level by, for example, initiating a text exchange between a user device and a third-party emergency service system, initiate a phone call from the third-party emergency service system to the user device, or directly dispatch emergency services to the user device's current location. Thus, the emergency system avoids the pitfalls of conventional systems by providing tailored emergency services in a way that does not wholly rely on the outdated infrastructure of publicly-available emergency resources.

As suggested above, in one or more embodiments, the emergency system can detect a transportation irregularity associated with a transportation of a requestor by a provider based on transportation signals associated with the transportation. For example, the emergency system can identify, receive, or otherwise select various transportation signals relative to a matched transportation request. To illustrate, the emergency system can receive interaction information from a client device indicating that the user of the client device has selected a communication option or an emergency option in a transportation system user interface. In another embodiment, the emergency system can receive a client device's current speed and location relative to a predetermined transportation route or pre-selected drop-off location.

Based on these and other signals described in more detail below, the emergency system can determine that there is a transportation irregularity associated with the transportation request. The emergency system can determine that a transportation irregularity is occurring or has occurred. For example, the emergency system can use a score-based approach to determine a confidence (e.g., probability or likelihood) of a transportation irregularity. The emergency system can then determine an appropriate response based on a severity level associated with the transportation irregularity and the confidence level associated with the detection of that transportation irregularity.

To illustrate, the emergency system may generate a high confidence score associated with transportation signals indicating that a transportation irregularity has occurred associated with a transportation. To illustrate, the emergency system might detect that an actual drop-off location for a transportation (e.g., at the completion of transportation associated with a transportation request) occurred outside of a threshold distance from the drop-off location specified in the transportation request by the requestor. The emergency system can further determine that this type of transportation irregularity has a high severity level. Based on this information, the emergency system can customize a response accordingly. In another example, the emergency system may generate a high confidence score associated with transportation signals indicating that a requestor client device's current location is rapidly moving away from a predetermined route associated with an ongoing transportation. The emergency system can then determine that this type of transportation irregularity also has a high severity level. In yet another example, the emergency system may generate a high confidence score associated with transportation signals indicating that a requestor client device has stopped moving along a predetermined route (e.g., possibly indicating problems with the transportation vehicle). The emergency system may determine that this type of transportation irregularity is associated with a moderate severity level. In other examples, the emergency system can utilize other approaches (e.g., heuristic-based approaches, machine learning-based approaches) to detect transportation irregularities and corresponding confidence levels, and determine the emergency severity levels associated with the detected irregularities.

In addition to the transportation irregularities mentioned above, the emergency system can detect and other types of transportation irregularities. For example, the emergency system can detect transportation irregularities including, but not limited to, route departures, erratic driving, collisions, long drop-offs, unexpected drop-offs, physical altercations, verbal altercations, loss of network connectivity, car problems, bad weather, late-night transportations, or any other safety or emergency situations associated with transportation. As such, the emergency system detects many types of transportation irregularities with confidence, and can further determine severity levels associated with the detected transportation irregularities. Moreover, detecting a transportation irregularity can comprise detecting an explicit user interaction (e.g., selection of an emergency assistance option) indicating an emergency situation or requesting emergency assistance.

The emergency system can further provide an emergency assistance user interface based on the detected transportation irregularity and corresponding emergency severity level associated with the detected transportation irregularity. For example, the emergency system can cause a client device to display an emergency assistance user interface comprising at least one selectable emergency assistance option, such as an option to initiate or receive a communication or an option to request dispatch of emergency services. To illustrate, the emergency system can provide an emergency assistance user interface including a call input, a message input, and an emergency input. In one or more embodiments, the selectable emergency assistance options can be activated based on a user interaction, such as a touch gesture (e.g., as with a touch screen button). Additionally, in one or more embodiments, one or more selectable emergency assistance options can be activated based on a non-action, such as an expiration of a time period associated with the emergency assistance user interface without receiving user input.

In response to detecting a user interaction with at least one of the selectable emergency assistance options in the emergency assistance user interface, the emergency system can generate an emergency communication based on both the user interaction and the emergency severity level associated with the transportation irregularity. For example, the emergency system can generate a first type of emergency communication in response to: 1) determining that the severity level associated with the transportation irregularity is moderate, and 2) detecting a user interaction with a "text me" button in the emergency assistance user interface. In another example, the emergency system can generate a second type of emergency communication in response to: 1) determining that the severity level associated with the transportation irregularity is high, and 2) detecting a user interaction with a "call me" button in the emergency assistance user interface.

The emergency system can further generate and send emergency communications to a remote third-party system. For example, in response to determining a moderate severity level associated with transportation irregularity, the emergency system can generate and send an emergency communication to a remote third-party system that instructs the service provider to contact the user via text to inquire further regarding the transportation irregularity. In another example, in response to determining a high severity level associated with transportation irregularity, the emergency system can generate and send an emergency communication to the remote third-party system that instructs the remote third-party system to dispatch emergency services to the current location of the client device associated with the user.

In one or more embodiments, the emergency system can route the emergency communication to a remote third-party system to cause the remote third-party system to generate a communication session between a mobile device associated with a user associated with an emergency and the remote third-party system. For example, the emergency system can include information in the generated emergency communication that causes the remote third-party system to establish an SMS text communication session with the user's mobile device. In another example, the emergency system can include information in the generated emergency communication that causes the remote third-party system to establish a cellular phone call with the user mobile device. Additionally or alternatively, the emergency system can include information in the generated emergency communication that causes the remote third-party system to establish a communication session with the emergency system such that the emergency system can continually provide monitored information related to the emergency to the remote third-party system, and receive situation updates from the remote third-party system related to emergency services dispatch.

As mentioned above, conventional systems' reliance on outdated emergency response technology leads to other computational problems with regard to accuracy, efficiency, and flexibility. The present emergency system improves on the accuracy of conventional systems because the emergency systems generates and provides an emergency communication to a remote third-party system that includes accurate information related to the user (e.g., location information, transportation irregularity information) to a remote third-party system—thereby improving the remote third-party system's situational response. For example, the emergency system can accurately provide the user's current location, information associated with the current transportation match (e.g., pickup location, drop-off location, vehicle type, license plate number, etc.), and other profile information about the user (e.g., user's name, user's residency information). Thus, the emergency system provides an emergency solution that accurately utilizes data and network communications.

Moreover, the emergency system improves on the efficiency of conventional systems. Specifically, the emergency system efficiently utilizes computing resources by providing a level of emergency communication (and associated information) that corresponds to a determined level of severity relative to a current transportation irregularity. For example, if the determined level of severity relative to a current transportation irregularity is low, the emergency system does not waste computing resources in automatically dispatching a full emergency response. Instead, the emergency system can initiate an SMS text exchange between the user and a remote third-party system—thus utilizing computing resources more efficiently with a smaller-scale response.

The emergency system further improves the efficiency of using electronic devices in emergency situations. For example, rather than the user interfaces of conventional systems that are static regardless of situation and might require a user to navigate through several pages and options to request the needed emergency assistance, the disclosed systems provide a user experience that is customized based on the emergency situation and allows a user to access emergency assistance much more quickly and efficiently. Indeed, in some embodiments disclosed herein, a user can access emergency assistance using a single interaction or without any interactions at all. This improved efficiency of using electronic devices can be critical in emergency situations.

The emergency system also improves on the flexibility of conventional systems by providing multiple emergency assistance options in response to different severity levels associated with transportation irregularities. For example, as mentioned above and as discussed in more detail below, the emergency system customizes a communication interface (e.g., as displayed by a client device) and corresponding communication sessions between a user device and a remote third-party system based on the specific information analyzed for the emergency. Additionally, the emergency system also enables automatic dispatch of emergency assistance based on a severity level and confidence associated with a transportation irregularity.

As illustrated by the foregoing discussion, the present disclosure utilizes a variety of terms to describe features and advantages of the emergency system. For example, as used herein, the term "transportation request" refers to a request from a requesting individual (i.e., a requestor) for transport by a transportation vehicle. In particular, a transportation request includes a request for a transportation vehicle to transport a requestor or a group of individuals from one geographic area to another geographic area. The transportation request can include data associated with a requestor device, including a request location (e.g., a location from which the transportation request is initiated), a destination (e.g., a location to which the requestor wishes to travel), a pickup location or a drop-off location where a requestor can be respectively picked up for transportation or dropped off from transportation (which geographic areas may be the same as or different from the request location and destination), location profile information, a requestor rating, a travel history, a search history, etc. In some cases, a drop-off location constitutes and is the same as a destination. Additionally, or alternatively, a transportation request can include a request to be transported in a certain manner (e.g., according to a service category type such as standard, premium, luxury, shared, shared saver, wheel-chair accessible, etc.).

As suggested above, the term "transportation provider" (or "provider") refers to a driver or other person who operates a transportation vehicle and/or who interacts with a provider client device, on the one hand, or an autonomous vehicle, on the other hand. For instance, a transportation provider includes a person who drives a transportation vehicle along various transportation routes—or an autonomous vehicle that drives along such transportation routes—to pick-up and drop-off requestors.

As suggested above, the term "transportation requestor" (or "requestor") refers to a person who submits (or is projected to submit) a transportation request to a dynamic transportation matching system and/or who interacts with a requestor client device. For instance, a transportation requestor includes a person who interacts with a requestor client device to send a transportation request to a dynamic transportation matching system. After the dynamic transportation matching system matches a requestor with a provider, the requestor can await pickup by the provider at a predetermined pickup location. Upon arrival of the provider, the requestor can engage with the provider by getting into a transportation vehicle associated with the provider for transport to a destination specified in the requestor's transportation request. Accordingly, a requestor may refer to (i) a person who requests a ride or other form of transportation but who is still waiting for pickup, (ii) a person whom a transportation vehicle has picked up and who is currently riding within the transportation vehicle to a destination, or (iii) a person whom a transportation vehicle has recently dropped off at a destination (e.g., a specified or unspecified destination).

As used herein, the term "signal" (or "transportation signal") refers to data indicating an attribute, characteristic, condition, or element of a transportation or transportation request. For example, a signal can include data indicating a current location of a client device (e.g., a provider client device and/or a requestor client device), a current speed of a transportation vehicle, current weather conditions relative to a position of the transportation vehicle, current traffic conditions relative to a position of the transportation vehicle, the current position of the transportation vehicle relative to a predetermined route to a destination specified in a transportation request, and so forth. Additionally, signals may include telematic data from a client device (e.g., such as ambient sound volume levels, gyrometric data indicating movement of a client device). Such signals may be generated or received in real (or near-real) time. Additionally, a signal can include historical data indicating a transportation history of a provider associated with a provider client device, a transportation history of a requestor associated with a requestor client device, and historical transportation metrics associated with the geographic area specified in the transportation request. The foregoing signals are merely examples, and a dynamic transportation matching system may receive other signals, as described below.

As used herein, the term "transportation irregularity" refers to information or data that is unexpected or out of the ordinary for a given transportation or route, and which represents a potential emergency situation or safety incident. In one or more embodiments, a transportation irregularity can represent a potential emergency for one or more of a requestor or provider associated with a transportation request, as discussed in more detail herein. For example, prior to a matched requestor pick-up, during transportation of the requestor, or upon completion of the transportation of the requestor, the emergency system can determine that a transportation irregularity has occurred based on the analysis of various transportation signals. Based on the transportation irregularity, the emergency system can determine a course of action for addressing the transportation irregularity. =Additionally, a transportation irregularity can represent other types of transportation situations where one or more of the requestor and provider might need assistance. For example, the emergency system can determine, based on transportation signals, that the transportation vehicle is experiencing a problem (e.g., a flat tire, engine overheating).

As used herein, the term "severity level" or "level of severity" associated with a transportation irregularity refers to a classification or tier associated with a transportation irregularity, and which represents a potential severity of an emergency situation. For example, the emergency system can classify transportation irregularities using a low, moderate, or high severity level to represent the severity of the transportation irregularity and corresponding action to be taken. In some embodiments, the assignment of transportation irregularities to severity levels is predetermined. Furthermore, each severity level may be associated with corresponding customized response, including one or more of customized user interfaces, customized communications, or other customized actions.

In one or more embodiments, the emergency system can identify various types of transportation irregularities. To illustrate, the emergency system can analyze transportation signals associated with a transportation to determine a scheduling irregularity that the provider is transporting a requestor during an uncommon time period when that provider (e.g., the provider typically does not provide transportation in between 1am and 5 am). Such a transportation irregularity may be associated with a low severity level. In another example, the emergency system can analyze transportation signals associated with a transportation to determine a vehicle irregularity indicating a likely problem with the transportation vehicle (e.g., a flat tire). Such a vehicle irregularity may be associated with a moderate severity level. In another example, the emergency system can analyze transportation signals associated with a transportation to detect an altercation is likely occurring between the provider and the requestor in the transportation vehicle. Such an interpersonal irregularity may be associated with a high severity level. Based on these detected transportation irregularities and the corresponding severity levels, the emergency system can escalate the emergency response accordingly, as discussed in more detail below.

Furthermore, in additional or alternative embodiments, detecting a transportation irregularity may include detecting a "long drop-off" or an "unexpected drop-off" As used herein, a long drop-off refers to a transportation irregularity that occurs when a provider (i.e., provider client device) remains within a threshold distance of a drop-off location associated with a completed transportation request for more than a threshold amount of time. As used herein, an unexpected drop-off refers to a transportation irregularity that occurs when a requestor is dropped off at a location that is more than a threshold difference from a destination or drop-off location specified in a transportation request.

The emergency system can identify transportation irregularities based on various signals. For example, the emergency system can gather, monitor, and analyze GPS signals (e.g., indicating route departures or erratic driving), network connectivity signals (e.g., indicating a loss of network connectivity), user input signals (e.g., indicating user interactions with client devices or user requests for assistance), audio levels (e.g., indicating unexpected noises, such as collisions between vehicles or altercations between users), timing signals (e.g., indicating that transportation is occurring at an unusual time or is taking an unusually long time to complete), motion signals (e.g., accelerometer data indicating client device movement), other communication signals from client devices, or any other signals from data associated with fulfilling a transportation request. Importantly, the emergency system can take appropriate action to protect the privacy of users when gathering and analyzing the signals associated with a transportation. For example, the emergency system can obfuscate or otherwise anonymize the signals. Furthermore, the emergency system can require user opt-in before gathering and analyzing the signals. Moreover, the emergency system can store the signals for only as long as necessary to resolve an emergency situation.

Turning now to the figures, FIG. 1 illustrates a schematic diagram of an environment 100 for implementing an emergency system 105 in accordance with one or more embodiments. As shown in FIG. 1, the environment 100 includes a server(s) 102 comprising a dynamic transportation matching system 104 and the emergency system 105, the transportation vehicle 108, the provider client device 110 corresponding to the transportation vehicle 108, the requestor client device 116 corresponding to the requestor 120, and a network 106. In some embodiments, the transportation vehicle 108 optionally includes the provider 114. The provider 114 in this example is a human provider associated with both the transportation vehicle 108 and the provider client device 110.

As shown, in one or more embodiments, the emergency system 105 can be a component of the dynamic transportation matching system 104 implemented on one or more of the server(s) 102. In these or other embodiments, the emergency system 105 may perform one or more acts of the present disclosure described in conjunction with the dynamic transportation matching system 104. Additionally, or alternatively, the dynamic transportation matching system 104 may perform one or more acts of the present disclosure described in conjunction with the emergency system 105. Furthermore, although FIG. 1 depicts the emergency system 105 and the dynamic transportation matching system 104 as distinct systems, the emergency system 105 can be implemented in whole or in part by the dynamic transportation matching system 104, and vice-versa.

As indicated by FIG. 1, the dynamic transportation matching system 104 uses the server(s) 102 to communicate with one or both of the provider client device 110 and the requestor client device 116 via the network 106. For example, the dynamic transportation matching system 104 communicates with the provider client device 110 and the requestor client device 116 via the network 106 to determine locations of the provider client device 110 and the requestor client device 116. Per device settings, for instance, the dynamic transportation matching system 104 may receive location coordinates from the provider client device 110 and/or the requestor client device 116. Based on the location coordinates, the dynamic transportation matching system 104 matches or assigns the transportation vehicle 108 with the requestor 120 for transportation.

As suggested above, the provider client device 110 and the requestor client device 116 may comprise a mobile device, such as a laptop, smartphone, or tablet associated with a requestor or a provider. The provider client device 110 and the requestor client device 116 may be any type of computing device as further explained below with reference to FIG. 10. In some embodiments, the provider client device 110 is not associated with providers, but is attached to (or integrated within) the transportation vehicles 108.

As further indicated by FIG. 1, the provider client device 110 includes the provider application 112. Similarly, the requestor client device 116 includes the requestor application 118. In some embodiments, the provider application 112 (or the requestor application 118) comprises web browsers, applets, or other software applications (e.g., native applications) respectively available to the provider client device 110 or the requestor client device 116. Additionally, in some instances, the dynamic transportation matching system 104 provides data including instructions that, when executed by the provider client device 110 or by the requestor client device 116, respectively create or otherwise integrate one of the provider application 112 or the requestor application 118 with an application or webpage.

As further indicated by FIG. 1, a requestor may use a requestor application to request transportation services, receive a price estimate for the transportation service, edit a transportation request, or access other transportation-related services. For example, in some cases, the requestor 120 may interact with the requestor client device 116 through graphical user interfaces of the requestor application 118 to select an emergency input, and otherwise interact with other features of the emergency system 105.

As further depicted in FIG. 1, the dynamic transportation matching system 104 sends requests from the requestor client device 116 or other notifications to the provider client device 110 within the transportation vehicle 108. While FIG. 1 depicts the transportation vehicle 108 as an automobile, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the dynamic transportation matching system 104 sends a transportation request to the transportation vehicle 108—or queries location information from the transportation vehicle 108—the dynamic transportation matching system 104 sends the transportation request or location query to the provider client device 110. Accordingly, the transportation vehicle 108 and the provider client device 110 are part of a vehicle subsystem.

Although not illustrated in FIG. 1, in some embodiments, the environment 100 may have a different arrangement of components and/or may have a different number or set of components altogether. In certain implementations, for instance, the transportation vehicle 108 does not include a human provider, but constitutes an autonomous transportation vehicle—that is, a self-driving vehicle that includes computer components and accompanying sensors for driving without manual-provider input from a human operator. As a further example, in some embodiments, the transportation vehicle 108 includes a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle 108.

As mentioned above, the transportation vehicle 108 includes the provider client device 110 separate or integral to the transportation vehicle 108. Additionally, or alternatively, the provider client device 110 may be a subcomponent of a vehicle computing system. Regardless of its form, the provider client device 110 may include various sensors, such as a GPS locator, an inertial measurement unit, an accelerometer, a gyroscope, a magnetometer, and/or other sensors, from which the dynamic transportation matching system 104 can access information, such as location information. In one or more embodiments, the requestor client device 116 includes the same sensors.

In some embodiments, the dynamic transportation matching system 104 communicates with the provider client device 110 through the provider applications 112. For instance, the provider application 112 can cause the provider client device 110 to communicate with the dynamic transportation matching system 104 to navigate to a pickup location to pick up a requestor; navigate to a destination location; identify a change in destination, route, or waypoint; identify a restriction on changing a destination, route, or waypoint; and/or collect fares.

As shown in FIG. 1, in some embodiments, the emergency system 105 receives signals from one or more of the provider client device 110 and the requestor client device 116, detects a transportation irregularity, and determines an emergency severity associated with the transportation irregularity. The emergency system 105 can generate an emergency assistance user interface that includes various inputs with which a user (e.g., a provider 114 or a requestor 120) may interact. In response to a detected user interaction, the emergency system 105 can generate and route an emergency communication to a remote third-party system 122 to cause the remote third-party system 122 to generate a communication session between the client device (e.g., the requestor client device 116 or the provider client device 110) and the remote third-party system 122. The third-party system 122 may be associated with a private provider of emergency services (e.g., ®ADT).

In one or more embodiments, the remote third-party system 122 is a system available over the network 106 that includes various computing devices and is associated with trained responders (e.g., humans or intelligent systems) who can receive and respond to emergency communications in connection with transportation irregularities. For example, unlike traditional publicly available emergency response systems (e.g., 911 services), the remote third-party system 122 can give various levels of response to an emergency communication. To illustrate, in response to receiving an emergency communication indicating a low severity level associated with a transportation irregularity, the remote third-party system 122 can send a text message to a client device that inquires for further details regarding the transportation irregularity. In response to receiving an emergency communication indicating a high severity level associated with a transportation irregularity, the remote third-party system 122 can directly dispatch first responders (e.g., police, ambulance) to a location of the client device.

Figure 2:
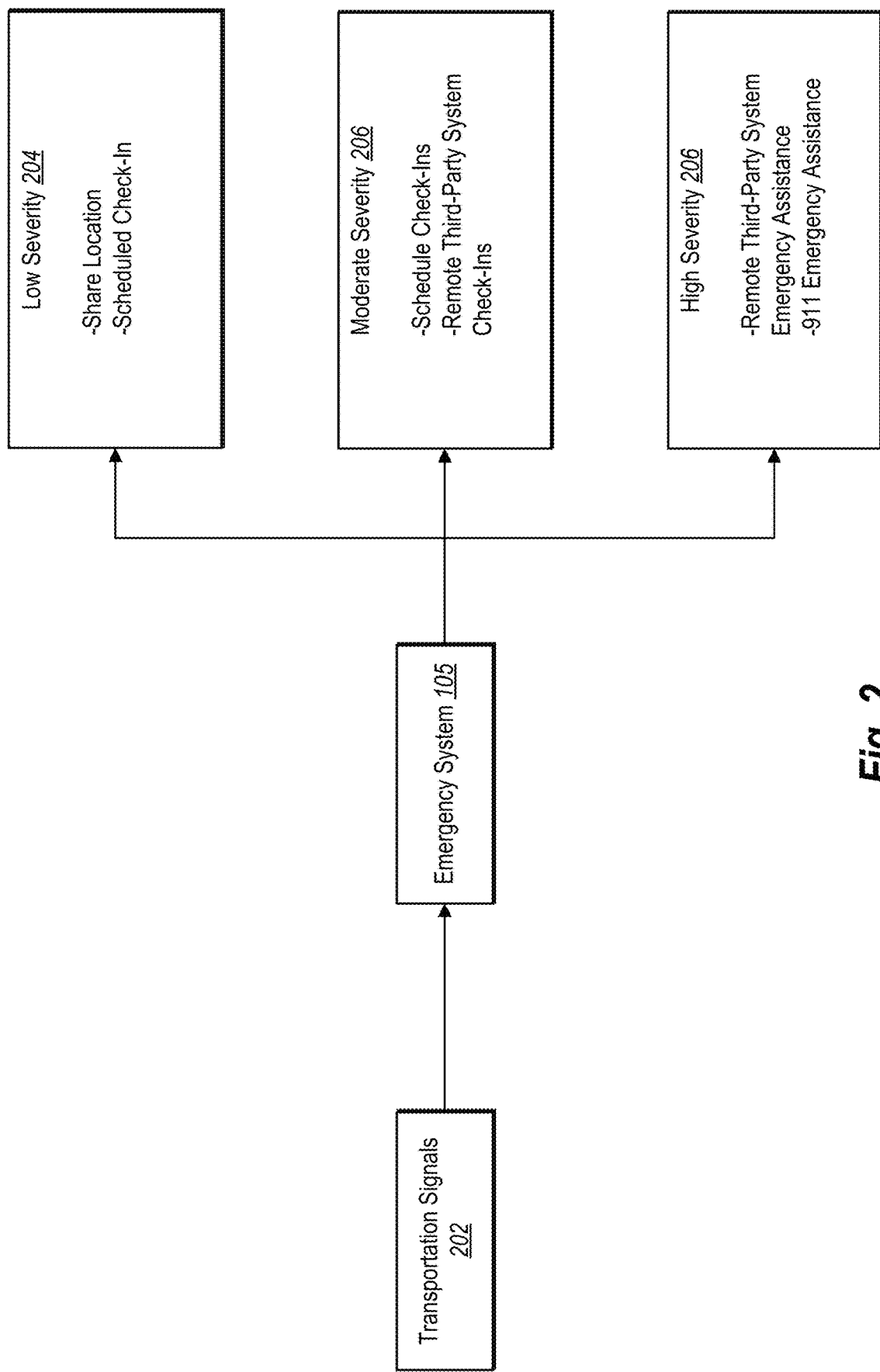
FIG. 2 illustrates an overview of the emergency system determining severity levels and providing emergency assistance and other services depending on a determined severity level associated with a transportation irregularity in accordance with one or more embodiments.

FIG. 2 illustrates an example overview of the emergency system 105 determining severity levels and providing emergency assistance and other services depending on a determined severity level associated with a transportation irregularity. In one or more embodiments, as shown in FIG. 2, the emergency system 105 receives transportation signals 202 to detect a transportation irregularity with a high level of confidence. For example, the emergency system 105 can receive transportation signals 202 from one or both of the provider client device 110 and the requestor client device 116. Transportation signals 202 can include current and past GPS position data, speed and direction data, user profile and account data, route data, transportation match data, and telematic data (e.g., noise levels). The emergency system 105 can receive transportation signals 202 associated with an active transportation of the requestor 120 in real-time as the transportation vehicle 108 travels along a route associated with the transportation match, or during a time period following pickup of the requestor 120 by the provider 114 in the transportation vehicle 108.

In response to receiving transportation signals 202 associated with a transportation match, the emergency system 105 can detect a transportation irregularity. For example, and as will be discussed in greater detail below, the emergency system 105 can apply one or more trained machine learning models, rules, decision trees, knowledge graphs, and so forth to the transportation signals 202 to detect and/or predict a transportation irregularity with a high level of confidence. For instance, the emergency system 105 can detect and/or predict a transportation irregularity with more than a threshold percentage of likelihood. To illustrate, the emergency system 105 can apply a trained machine learning model to the transportation signals 202 to generate a transportation irregularity classification (e.g., "verbal altercation") and a corresponding confidence score (e.g., 78% likely).

In one or more embodiments, in response to determining that the confidence score is at or above a predetermined percentage (e.g., more than 75% likely), the emergency system 105 can determine a severity level associated with the detected transportation irregularity. For example, as shown in FIG. 2, the emergency system 105 can determine that one of three severity levels is associated with the transportation irregularity, such as a low severity level 204, a moderate severity level 206, and a high severity level 208. In additional or alternative embodiments, the emergency system 105 can determine that one of more or fewer severity levels is associated with the transportation irregularity. In additional or alternative embodiments, the emergency system 105 can generate different or alternative responses to each of the severity levels 204-208 of transportation irregularities than those illustrated in FIG. 2.

In at least one embodiment, the emergency system 105 determines the severity level associated with transportation irregularity by matching the detected transportation irregularity to one of an existing set of known transportation irregularities. Additionally or alternatively, the emergency system 105 can apply a trained machine learning model to the detected transportation irregularity to generate a severity level associated with the transportation irregularity, where the machine learning model is trained based on past usage data associated with the emergency system 105.

In response to determining a severity level associated with the transportation irregularity, the emergency system 105 can determine one or more responses to the transportation irregularity. For example, in response to determining that a transportation irregularity is associated with the low severity level 204, the emergency system 105 can generate responses including, but not limited to, a shared location response and/or a scheduled check-in response. To illustrate, in response to determining low severity associated with a transportation irregularity, the emergency system 105 generate a shared location response by sharing a current location of the provider client device 110 and/or the requestor client device 116 with one or more pre-configured contacts of the provider 114 and/or requestor 120. In another example, in response to determining low severity associated with a transportation irregularity, the emergency system 105 can generate a scheduled check-in response by generating one or more check-in messages (e.g., "Just checking in . . . everything ok?") pre-scheduled or otherwise opted in to by the provider 114 and/or the requestor 120.

Additionally, in response to determining that a transportation irregularity is associated with the moderate severity level 206, the emergency system 105 can generate a response including the scheduled check-in response (e.g., mentioned above), and/or can initiate one or more remote third-party system check-ins. For example, and as will be discussed in greater detail below, the emergency system 105 can generate and send an emergency communication to the remote third-party system 122 that causes the remote third-party system 122 to check in with the provider 114 and/or the requestor 120 (e.g., via text message, voice call, etc.).

Moreover, in response to determining that a transportation irregularity is associated with the high severity level 208, the emergency system 105 can generate a responses including initiating remote third-party system emergency assistance and/or initiating 911 emergency assistance. For example, and as will be discussed in greater detail below, the emergency system 105 can initiate remote third-party system emergency assistance by generating and sending an emergency communication to the remote third-party system 122 the causes the remote third-party system 122 to dispatch emergency assistance to the provider 114 and/or the requestor 120 (e.g., via a voice call, via in-person assistance dispatch). Additionally, and as will be discussed in greater detail below, the emergency system 105 can initiate 911 emergency assistance by providing 911 emergency services with the current location of the provider 114 and/or requestor 120, along with a description of the transportation vehicle 108 and the high severity level transportation irregularity.

Figure 3A:
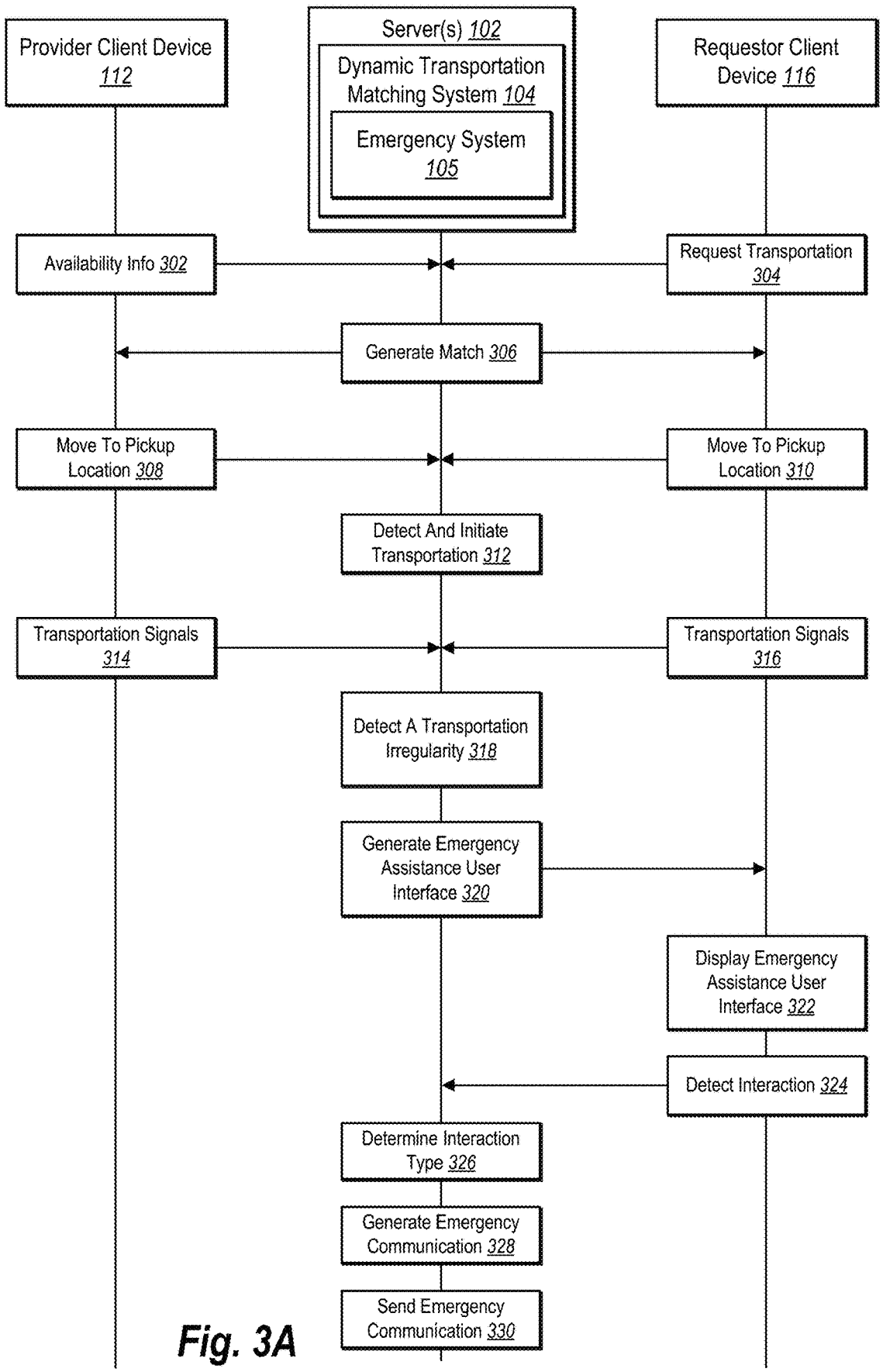
FIG. 3A illustrates a sequence diagram of the emergency system generating and providing an emergency assistance user interface in accordance with one or more embodiments.

FIG. 3A illustrates a sequence diagram of a series of steps undertaken by the emergency system 105 in providing an emergency assistance user interface in order to route emergency communications to a remote third-party system (e.g., in response to determining a high severity level associated with a transportation irregularity). As shown in FIG. 3A, the series of steps starts with the provider client device 110 providing availability information (302) to the dynamic transportation matching system 104. For example, the provider client device 110 can provide information regarding current location, current speed and direction, and profile information associated with the provider (e.g., the user of the provider client device 110).

Additionally, the requestor client device 116 can generate and provide a transportation request (304) to the dynamic transportation matching system 104. For example, via the requestor application 118, a requestor can configure a transportation request including a pickup location, a drop-off location, a transportation vehicle preference, and other transportation request information. In one or more embodiments, the requestor client device 116 may send the transportation request to the dynamic transportation matching system 104 en route to a pickup location or at a pickup location.

In response to receiving the transportation request from the requestor client device 116, the dynamic transportation matching system 104 can generate a transportation match (306) between the requestor client device 116 and the provider client device 110. For example, the dynamic transportation matching system 104 can generate the match utilizing machine learning, based on the current position of the provider client device, preferences of the provider and/or requestor, in formation in the transportation request (e.g., the pickup location, the drop-off location), user ratings, traffic conditions, and so forth.

The dynamic transportation matching system 104 can further communicate the transportation match to both the provider client device 110 and the requestor client device 116. For example, the dynamic transportation matching system 104 can provide information to the provider client device 110 that includes transportation information associated with the requestor 120 (e.g., the pickup location, requestor profile information), and the selected drop-off location specified in the transportation request from the requestor client device 116. The dynamic transportation matching system 104 can further provide information to the requestor client device 116 that includes transportation information associated with the provider 114 (e.g., identifying information associated with the transportation vehicle 108, rating information associated with the provider 114, pricing information associated with completion of the transportation request).

In response to receiving a notification of acceptance from the requestor client device 116, the dynamic transportation matching system 104 can dispatch the provider client device 110 to the specified pick up location. The dynamic transportation matching system 104 can further receive information from the requestor client device 116 and the provider client device 110 indicating that both devices are moving to the pickup location (308)(310). The dynamic transportation matching system 104 can further detect that transportation of the requestor 120 has initiated (312). For example, the dynamic transportation matching system 104 can analyze transportation signals from one or both of the requestor client device 116 and the provider client device 110 to determine that the requestor 120 has entered the transportation vehicle 108 and that the transportation vehicle 108 is moving along a route associated with the transportation request.

In one or more embodiments, the emergency system 105 receives transportation signals (314)(316) from one or both of the provider client device 110 and the requestor client device 116 associated with the transportation request. For example, as mentioned above, the emergency system 105 can receive transportation signals after generating the transportation match (306), but prior to detecting the initiation of transportation (312). Additionally, the emergency system 105 can receive transportation signals after detecting the initiation of transportation (312), but prior to detecting drop-off of the requestor 120 (e.g., while the transportation of the requestor 120 is ongoing). Furthermore, the emergency system 105 can continue to receive transportation signals for a predetermined amount of time following the completion of the transportation associated with the matched transportation request. For example, the emergency system 105 can receive transportation signals for a predetermined amount of time (e.g., twenty-four hours) after detecting that the requestor 120 has been dropped off at a destination (e.g., associated with a selected drop-off location specified in the transportation request, or an actual drop-off location different from the selected drop-off location).

In one or more embodiments, the emergency system 105 can receive and analyze a variety of transportation signals. For example, the emergency system 105 can receive: location information associated with the provider client device 110 and the requestor client device 116, gyroscopic and directional information associated with the provider client device 110 and the requestor client device 116, user interaction information (e.g., regarding user selections and inputs) associated with the provider client device 110 and the requestor client device 116, passive audio data from the provider client device 110 and the requestor client device 116, speed of travel information associated with the provider client device 110 and the requestor client device 116, proximity information associated with the provider client device 110 and the requestor client device 116 (e.g., the distance between the provider client device 110 and the requestor client device 116), network connectivity information associated with the provider client device 110 and the requestor client device 116, and dynamic transportation matching system account information associated with the provider client device 110 and the requestor client device 116.

As further shown in FIG. 3A, the emergency system 105 can detect a transportation irregularity associated with the transportation (318). For example, the emergency system 105 can utilize the information received from at least one of the requestor client device 116 or the provider client device 110 (e.g., the transportation signals) to determine that a distance between an actual drop-off location for the transportation and the selected drop-off associated with the transportation request exceeds a threshold distance (e.g., as with an unexpected drop-off). In another example, the emergency system 105 can utilize the information received from at least one of the requestor client device 116 or the provider client device 110 to determine that the provider client device 110 remains a threshold distance of the actual drop-off location of the requestor client device 116 for a threshold amount of time (e.g., as with a long drop-off). In additional examples, the emergency system 105 can utilize the same information to detect other types of transportation irregularities. For example, the emergency system 105 can utilize the transportation signals to detect a loss of network connectivity, a collision, erratic driving, and/or an interpersonal altercation.

The emergency system 105 can detect a transportation irregularity based on the received transportation signals in one or more ways. For example, the emergency system 105 can apply one or more rules, decision trees, and/or knowledge graphs to the received transportation signals to detect one or more transportation irregularities. Alternatively, in at least one embodiment, the emergency system 105 can generate an input vector based on the received transportation signals, and apply a trained machine learning model to the generated vector. For example, in response to the emergency system 105 applying the trained machine learning model to the generated vector, the machine learning model can output a prediction indicating a level of confidence that a transportation irregularity has occurred (e.g., 80% likely). In at least one embodiment, the machine learning model can further output a type or classification of the transportation irregularity. In one or more embodiments, the emergency system 105 can utilize a combination of any of these techniques. For example, the emergency system 105 can utilize the trained machine learning model to determine a level of confidence that a transportation irregularity has occurred, and can further apply a knowledge graph to the received transportation signals to determine the type or classification of the likely transportation irregularity.

In one or more embodiments, the emergency system 105 can determine an emergency severity level associated with the transportation request. To illustrate, in some embodiments, the emergency system 105 can utilize a heuristics-based approach, a score-based approach, and/or a machine learning-based approach to determine a severity of an emergency associated with a transportation request. Each of these approaches will now be discussed in greater detail.

In one or more embodiments, the emergency system 105 can utilize a heuristics-based approach to determine an emergency severity level associated with the detected transportation irregularity. For example, the emergency system 105 may apply a known set of rules or conditions to a detected transportation irregularity to determine if any of the rules or conditions are satisfied or met. To illustrate, the emergency system 105 may apply rules and/or conditions to a detected route departure transportation irregularity to determine that there is a moderate severity level associated with the transportation irregularity. In response to this determination, the emergency system 105 can assign a moderate severity level to the transportation irregularity associated the transportation match.

In another embodiment, the emergency system 105 can further leverage heuristics as part of a score-based approach for determining an emergency severity level associated with a transportation irregularity. For example, the emergency system 105 can assign scores to transportation signals that satisfy different tiers or levels of rules or conditions. To illustrate, the emergency system 105 can assign low scores to transportation signals satisfying conditions indicating a low severity level transportation irregularity (e.g., transportation vehicle is speeding, transportation is taking longer than expected due to traffic). Similarly, the emergency system 105 can assign high scores to transportation signals satisfying conditions indicating a high severity level transportation irregularity (e.g., actual drop-off location is more than a threshold distance from the selected drop-off location, transportation vehicle has remained within a predetermined distance from a drop-off location for more than a threshold amount of time). Alternatively, the emergency system 105 can generate the emergency scores to represent a likelihood or confidence associated with a transportation irregularity.

In at least one embodiment, the emergency system 105 then determines a total or other combination/result based on all of the transportation signals. If the total emergency score is within a particular range, the emergency system 105 can assign an emergency severity level to the transportation request that corresponds to the particular range. For example, if the total emergency score is in-between zero and thirty, the emergency system 105 can determine that there is no or a low emergency severity level associated with the transportation irregularity detected in connection with the transportation signals. If, for example, the total emergency score is in-between thirty one and sixty five, the emergency system 105 can determine that there is a moderate emergency severity level associated with the transportation irregularity detected in connection with the transportation signals. If, for example, the total emergency score is in-between sixty six and one hundred, the emergency system 105 can determine that there is a high emergency severity level associated with the transportation irregularity detected in connection with the transportation signals.

In yet another embodiment, the emergency system 105 can determine an emergency severity level associated with a transportation irregularity utilizing machine learning. For example, the emergency system 105 can use historical training data to train an emergency severity neural network to approximate unknown functions in order to output severity determinations. To illustrate, the emergency system 105 can implement deep learning techniques to cause the emergency severity neural network to analyze input (e.g., training input encoded as a neural network input vector) to make predictions and improve in accuracy by comparing generated predictions against ground truth data and modifying internal parameters for subsequent predictions. In some embodiments, the emergency severity neural network can employ supervised learning, while in other embodiments the emergency severity neural network can employ unsupervised learning or reinforced learning. Examples of emergency severity neural networks include deep convolutional neural networks, decision trees, generative adversarial neural networks, and recurrent neural networks.

In addition to training the emergency severity neural network utilizing known inputs and outputs (e.g., ground truth data), the emergency system 105 can further utilize the emergency severity neural network to make emergency severity level predictions with new inputs. For example, the emergency system 105 can generate an input vector based on received transportation signals. The emergency severity neural network can generate an emergency severity level prediction based on the generated input vector that specifies severity level of transportation irregularity associated with a transportation match. In one or more embodiments, the emergency severity neural network can output the severity level prediction as a score or as a binary value.

Returning to FIG. 3A, based on the determined emergency severity level associated with a transportation match, the emergency system 105 can generate and provide an emergency assistance user interface (320). For example, the emergency system 105 can customize the emergency assistance user interface to include different types of content and/or selectable options based on the determined severity level. In one embodiment, in response to a moderate severity level determined in connection with a transportation irregularity, the emergency system 105 customizes the emergency assistance user interface to include selectable options including a call input and a message input. In another embodiment, in response to a high severity level in connection with a transportation match, the emergency system 105 customizes the emergency assistance user interface to include selectable communication options, and at least one selectable emergency option. Additionally or alternatively, the emergency system 105 can generate the emergency assistance user interface including all available selectable options (e.g., communication options and emergency options), but may arrange the selectable options differently depending on the determined severity level associated with the transportation irregularity. Additionally or alternatively, the emergency system 105 can generate the emergency assistance user interface including all available selectable options but with different text (e.g., printed instructions associated with the inputs) depending on the determined emergency severity level.

Although FIG. 3A illustrates the emergency system 105 providing the generated emergency assistance user interface to the requestor client device 116, in additional embodiments, the emergency system 105 can generate and provide the emergency assistance user interface for and to the requestor client device 116 or the provider client device 110. For example, in at least one embodiment, the emergency system 105 can utilize the received transportation signals to determine which of the requestor client device 116 or the provider client device 110 is likely experiencing the detected transportation irregularity.

To illustrate, in one example, transportation signals including increased audio volume detected on the requestor client device 116, poor rating associated with the requestor 120, time and day of the week (e.g., 1:00 am on a Saturday), requestor history indicating past incidences of using the dynamic transportation matching system 104 while intoxicated, gender of the requestor (e.g., male) and the provider (e.g., female), may cause the emergency system 105 to determine that the provider 114 is potentially experiencing an interpersonal altercation with the requestor 120. In that example, the emergency system 105 might provide the generated emergency assistance user interface to the provider client device 110.

In another example, transportation signals indicating a sudden decrease in speed associated with the transportation vehicle, that the transportation vehicle has not moved for a threshold amount of time, and traffic conditions associated with the geographic region where the transportation vehicle is located, the emergency system 105 to determine that both the provider 114 and the requestor 120 are potentially experiencing a car accident. In that example, the emergency system 105 can provide the generated emergency assistance user interface to both the provider client device 110 and the requestor client device 116.

In at least one embodiment, when the emergency system 105 provides the generated emergency assistance user interface to a provider client device (e.g., the provider client device 110), the emergency system 105 can also cause the provider client device 110 to go offline from the dynamic transportation matching system 104. For example, the emergency system 105 can provide the generated emergency assistance user interface to the provider client device 110 so as to cause any features of the dynamic transportation matching system 104 (e.g., available via the provider application 112) to become disabled until the provider 114 interacts with the emergency assistance user interface in some way. In one or more embodiments, the emergency system 105 can similarly cause the requestor client device 116 to go offline from the dynamic transportation matching system 104 in response to receiving a generated emergency assistance user interface.

Returning to FIG. 3A, in response to receiving the generated emergency assistance user interface, the requestor client device 116 can display the emergency assistance user interface (322) via the requestor application 118 installed thereon. The requestor client device 116 can further provide interaction information (324) in connection with the emergency assistance user interface to the emergency system 105. In one or more embodiments, the requestor client device 116 can provide interaction information including any detected touch gestures in connection with the emergency assistance user interface, a pressure and duration of a detected touch gesture, a length of time that the emergency assistance user interface has had focus on the requestor client device 116, and other telematic information associated with the requestor client device 116 (e.g., current location, gyroscopic information, directional information, orientation information).

In response to receiving the interaction information, the emergency system 105 can determine the interaction type (326) associated with the emergency assistance user interface. For example, the emergency system 105 may determine that the user has selected the call input in response to touch gesture information associated with the call input of the emergency assistance user interface. In another example, the emergency system 105 may determine that the emergency assistance user interface has had focus on the requestor client device 116 for more than a predetermined amount of time (e.g., indicating that the alert input has count down to zero) without any user interaction.

As further illustrated in FIG. 3A, the emergency system 105 can generate an emergency communication (328) based on the determined interaction with the emergency assistance user interface. For example, in one or more embodiments, the emergency system 105 generates various types of emergency communications depending on the detected interactions relative to the emergency assistance user interface. To illustrate, in response to a determined selection of the selectable communication option associated with text messaging within the emergency assistance user interface, the emergency system 105 generates the emergency communication including instructions causing a third-party emergency service provider to send an SMS text message to the requestor client device. In another example, in response to determining that the count-down timer has count down to zero on the emergency assistance user interface, the emergency system 105 can generate the emergency communication including instructions causing the third-party emergency service provider to dispatch first responders to the current location of the requestor client device 116. As such, the emergency system 105 can generate the emergency communication including the contact instructions (e.g., text or call), the type of detected transportation irregularity, along with information associated with the transportation request (e.g., current location of requestor client device 116 and/or provider client device 110, determined emergency severity, profile information associated with the provider 114 and/or the requestor 120, make and model of the transportation vehicle 108).

After generating the emergency communication, the emergency system 105 can send the emergency communication (330). For example, the emergency system 105 can route the emergency communication to a remote third-party system 122. Additionally or alternatively, the emergency system 105 can route the emergency communication to a public emergency service (e.g., 911 services). In response to receiving the emergency communication the remote third-party system 122 can establish a communication session with the requestor client device 116 and/or provider client device 110. Additionally or alternatively, the remote third-party system 122 can establish a communication session with the emergency system 105 whereby both the remote third-party system 122 and the emergency system 105 can provide and receive updates associated with the detected transportation irregularity.

Although FIG. 3A shows the emergency system 105 providing the emergency assistance user interface to the requestor client device 116, the emergency system 105 can also provide emergency assistance user interfaces to the provider client device 110. For example, in response to determining that the provider 114 is experiencing a transportation irregularity, the emergency system 105 can provide the emergency assistance user interface to the provider client device 110. Additionally or alternatively, the emergency system 105 can provide the same or different emergency assistance user interfaces to both the requestor client device 116 and the provider client device 110 in response to a detected transportation irregularity (e.g., a detected car accident).

As mentioned above, in one or more embodiments, the emergency system 105 can generate and provide a push notification to a client device in response to detecting a transportation irregularity, and prior to generating and providing an emergency assistance user interface. For example, the emergency system 105 may provide a push notification (e.g., a small notification on a mobile device lock screen, a pop-up window on a mobile device home screen) when the requestor application 118 on the requestor client device 116, or the provider application 112 on the provider client device 110 has lost focus, or the requestor client device 116 or the provider client device 110 has turned off.

Figure 3B:
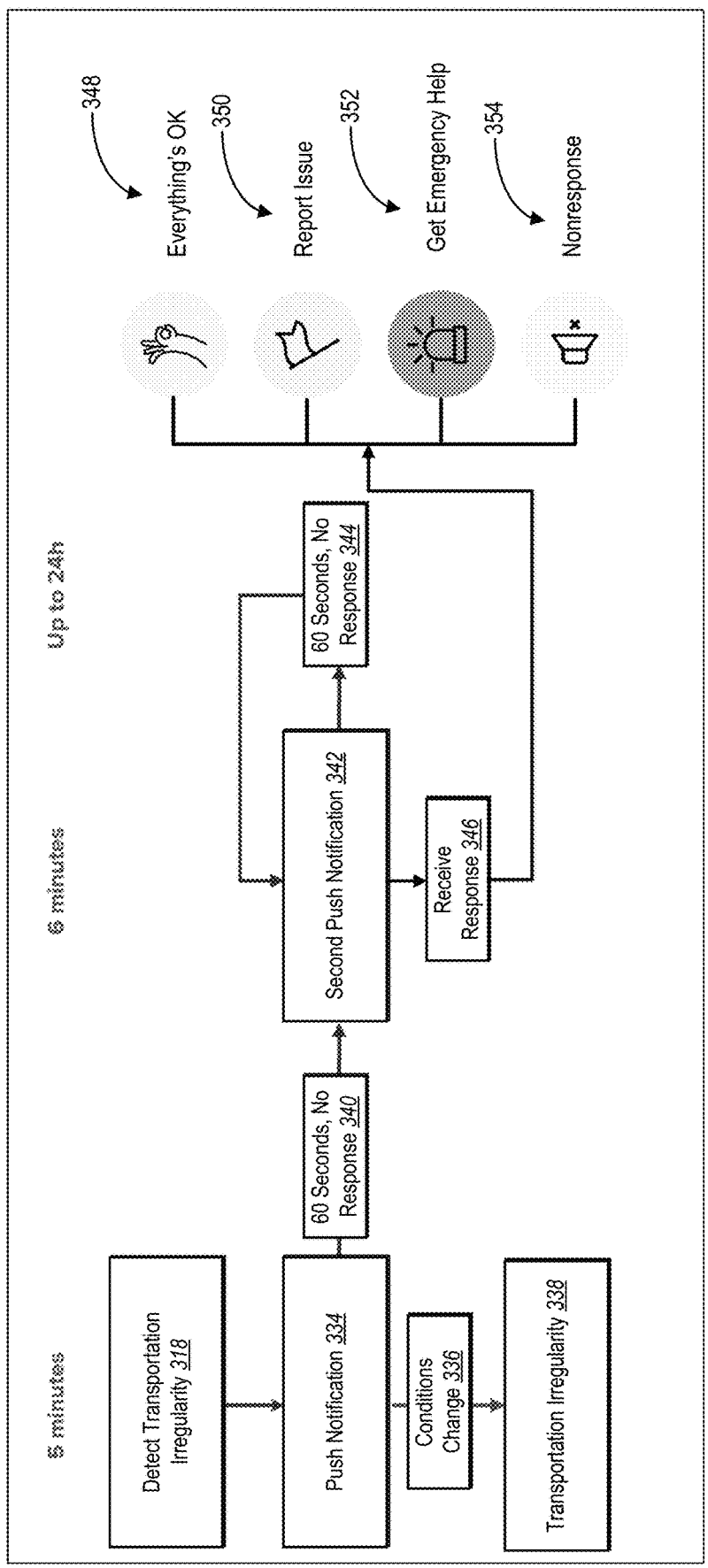
FIG. 3B illustrates a sequence diagram of the emergency system generating and providing push notifications in accordance with one or more embodiments.

FIG. 3B provides additional detail associated with how the emergency system 105 generates and provides push notifications to a client device (e.g., the requestor client device 116 or the provider client device 110). For example, as shown in FIG. 3B, at some amount of time into transportation (e.g., 5 minutes into transportation), the emergency system 105 can detect a transportation irregularity (318). As discussed above with reference to FIG. 3A, the emergency system 105 can detect the transportation irregularity based on a wide range of transportation signals from the requestor client device 116 and/or the provider client device 110.

In response to detecting the transportation irregularity (318), the emergency system 105 can generate and send a push notification (334). In one or more embodiments, the emergency system 105 generates the push notification to include language specific to the type of transportation irregularity (e.g., "Your drop-off isn't where you originally planned. Is everything ok?"), or to include general language (e.g., "Did your ride go OK? Tap if you need help."). The emergency system 105 can then cause the client device affected by the transportation irregularity to display the push notification overlaid on a lock screen, on a home screen, or on an active screen of a currently in-focus application.

In at least one embodiment, after sending the push notification (334), the emergency system 105 may detect a change in conditions (336) associated with the transportation irregularity. For example, the emergency system 105 may detect that the transportation vehicle 108 begins moving away from the drop-off location after having been parked for longer than a threshold amount of time (e.g., signaling no long drop-off). In another example, the emergency system 105 may detect that the audio volume registered by a client device has lowered (e.g., signaling a de-escalation of a verbal altercation). As such, the change in conditions associated with the transportation irregularity may signal to the emergency system 105 that the transportation irregularity has resolved or de-escalated. In one or more embodiments, the emergency system 105 can determine that the transportation irregularity has resolved or de-escalated utilizing updated transportation signals in connection with a machine learning model, or other similar technique.

In response to detecting a change in condition (336) relative to the transportation irregularity, the emergency system 105 can close the transportation irregularity (338). For example, the emergency system 105 can close a ticket created in response to detecting the transportation irregularity. The emergency system 105 may then continue to monitor transportation signals associated with the transportation, or may complete the transportation if drop-off has already occurred.

Alternatively, in response to detecting that the push notification has remained active on the client device for a threshold amount of time (e.g., 60 seconds) without detecting any user interaction in connection with the push notification (340), the emergency system 105 can generate and send a second push notification (342). For example, the emergency system 105 can generate the second push notification to include more urgent language (e.g., "It looks like you might be in an emergency situation. Tap to receive help."), or to include the same language as the first push notification. The emergency system 105 can replace the first push notification with the second push notification, or can cause the client device to display both push notifications. In one or more embodiments, the emergency system 105 can continue to send the second push notification to the client device at regular time intervals (e.g., 60 seconds, 15 minutes) for a threshold amount of time (e.g., up to twenty-four hours) while no user interaction or response is detected (344). Additionally or alternatively, the emergency system 105 can receive a response (346) to the either push notifications. For example, the emergency system 105 can detect a user touch gesture in connection with either push notification (e.g., a touch selection, a swipe selection), or other type of selection (e.g., a voice command, a tilt, a shake).

Based on the push notification and the type of detected user interaction, the emergency system 105 can determine an emergency severity associated with the transportation irregularity. For example, if the emergency system 105 detects a double-tap selection in connection with a push notification stating, "We detected an irregularity with your trip. Double tap if you are ok!", the emergency system 105 can determine that there is no emergency (348) associated with the transportation irregularity. In another example, if the emergency system 105 detects a tap selection in connection with a push notification stating, "We think there might be something wrong with your trip. Tap to report an issue.", the emergency system 105 can determine that there is a moderate emergency (350) associated with the transportation irregularity. In another example, if the emergency system 105 detects a tap selection in connection with a push notification stating, "We think you might be experiencing an emergency. Tap here to get help!", the emergency system 105 can determine that there is a severe emergency (352) associated with the transportation irregularity. Additionally or alternatively, if the emergency system 105 detects no response to the push notification for a threshold amount of time (e.g., 24 hours), the emergency system 105 might dismiss the transportation irregularity due to the non-response (354).

In one or more embodiments, the emergency system 105 can generate an emergency assistance user interface including different communication and/or emergency options depending on the determined emergency severity associated with the transportation irregularity. For example, the emergency system 105 can generate the emergency assistance user interface including a passive communication option (e.g., a "text me" button) in response to determining that there is a low emergency severity associated with the transportation irregularity. In another example, the emergency system 105 can generate the emergency assistance user interface including an active emergency option (e.g., a count-down timer) in response to determining that there is a high emergency severity associated with the transportation irregularity.

Figure 3C:
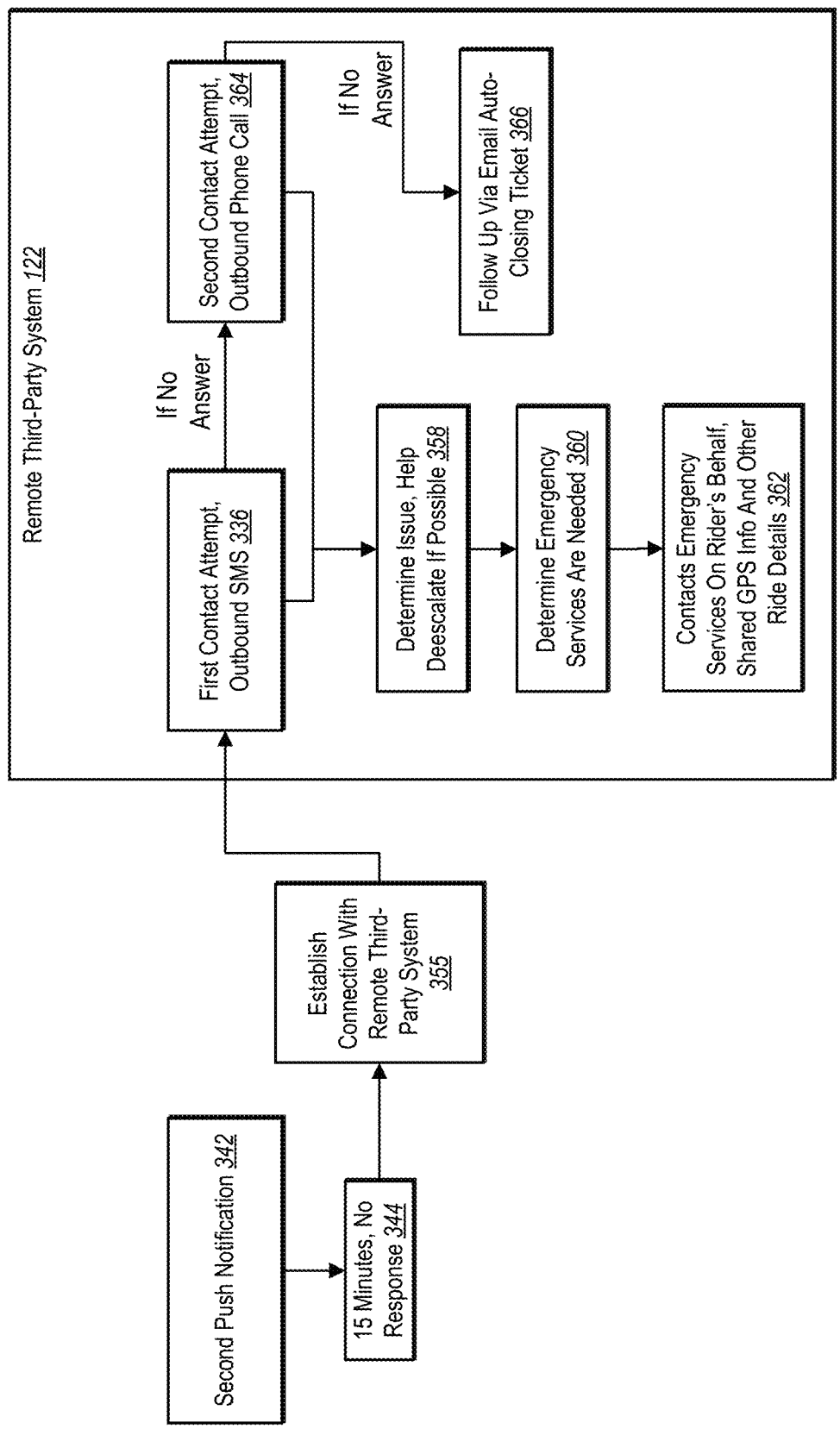
FIG. 3C illustrates a sequence diagram of the emergency system establishing a communication session with a remote third-party system in accordance with one or more embodiments.

In one or more embodiments, the emergency system 105 can interface with the remote third-party system 122 to provide additional user services. For example, in at least one embodiment, rather than closing a transportation irregularity in response to receiving no response to a second push notification (342) (e.g., as illustrated in FIG. 3B), the emergency system 105 can establish a communication session with the remote third-party system 122 in order to provide additional services to the client device. More specifically, as shown in FIG. 3C, after sending the second push notification (342) to the client device, the emergency system 105 can wait a threshold amount of time (344). For instance, the emergency system 105 can allow the second push notification to remain active on the client device for a threshold number of cycles of 15 minutes.

After waiting the threshold amount of time, the emergency system 105 can establish a communication session with the remote third-party system 122 (355). For example, the emergency system 105 can establish the communication session with the remote third-party system 122 by providing information associated with the detected transportation irregularity and the client device to the remote third-party system 122. For instance, the emergency system 105 can provide information including, but not limited to, the type and severity of the transportation irregularity, the location of the client device, and the contact information (e.g., phone number) associated with the client device. The emergency system 105 can further open a ticket associated with the transportation irregularity and the communication session in order to continue to provide and receive information associated with the transportation irregularity to and from the remote third-party system 122.

In response to the establishment of the communication session, the remote third-party system 122 can attempt to contact the client device. For example, as shown in FIG. 3C, the remote third-party system 122 can attempt a first contact by sending an outbound SMS text message to the client device (356). In one or more embodiments, the remote third-party system 122 can generate and send an SMS text message to the client device that identifies the remote third-party system 122 and requests that the user of the client device engage with the remote third-party system 122 (e.g., "We think you might be in an emergency. Are you ok?").

In response to receiving a response to the SMS text message, the remote third-party system 122 can further assess the transportation irregularity by attempting to de-escalate the irregularity (358), determine if emergency services are needed (360), and/or contacting additional emergency services (e.g., 911 emergency services) on behalf of the client device (362). For example, the remote third-party system 122 can engage with the user of the client device via SMS text such that the user can communicate silently (e.g., in case of an interpersonal altercation). The remote third-party system 122 can further utilize the information associated with the transportation irregularity and the client device to dispatch emergency services directed to the location of the client device in a way that does not require the user of the client device to speak with an emergency dispatcher.

If the remote third-party system 122 receives no response to the SMS text message, the remote third-party system 122 can make a second contact attempt (364) by making an outbound phone call to the client device. For example, a human operator associated with the remote third-party system 122 can call the client device in an attempt to gather more information associated with the transportation irregularity, de-escalate the transportation irregularity, and/or determine that additional emergency services are needed at the location of the client device. If the remote third-party system 122 receives no response to the phone call, the remote third-party system 122 can send a follow up email to the client device and closing the ticket associated with the transportation irregularity. For example, the remote third-party system 122 can close the communication session with the emergency system 105 and save anything information associated with the transportation irregularity and contact attempts for later reference.

Throughout the process of contacting and assessing the transportation irregularity, the remote third-party system 122 can provide updated information to the emergency system 105 via the established communication session. Additionally, the emergency system 105 can continually provide updated information to the remote third-party system 122 while the communication session remains established. For example, the emergency system 105 can provide updated location information associated with the client device such that the remote third-party system 122 can accurately dispatch emergency services to the client device's location if necessary.

Figure 3E:
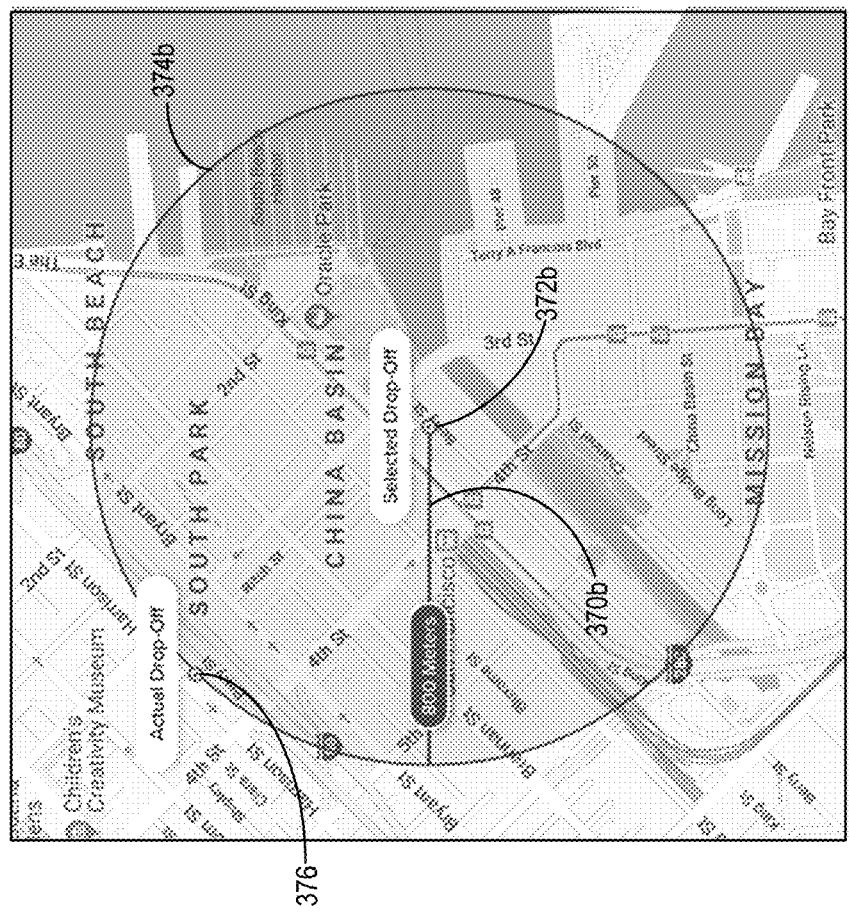
FIGS. 3D-3E illustrate example overviews of transportation irregularities detected by the emergency system in accordance with one or more embodiments.
Figure 3D:
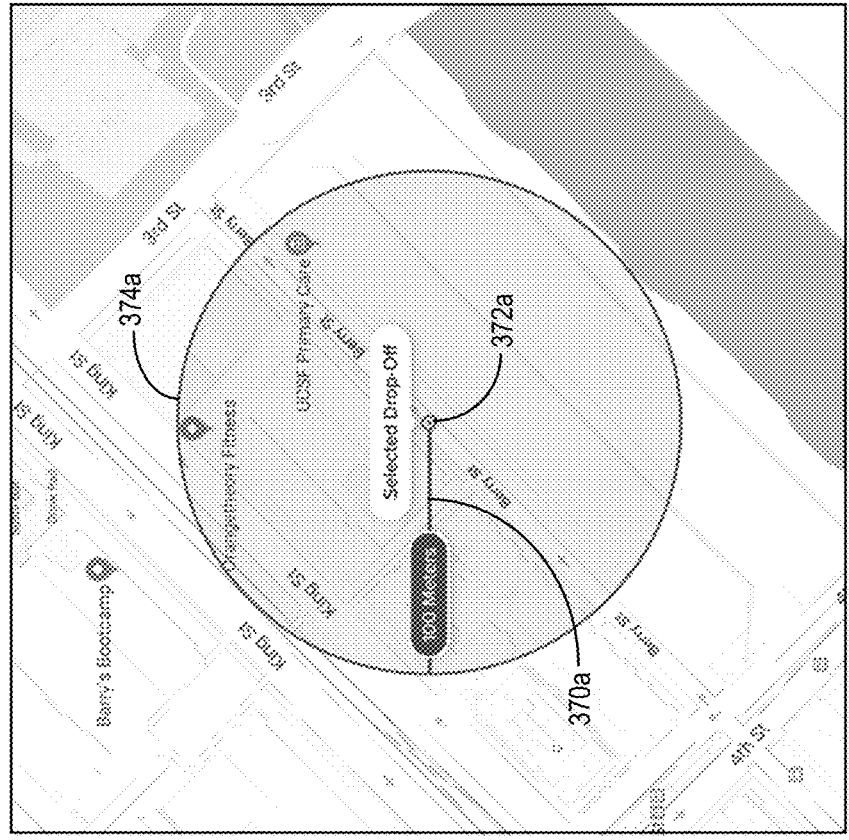

As mentioned above, the emergency system 105 can detect various types of transportation irregularities relative to a matched transportation request (e.g., either pending, ongoing, or completed). FIGS. 3D and 3E give additional detail and explanation as to various types of transportation irregularities detected by the emergency system 105. For example, FIG. 3D illustrates an example of a long drop-off transportation irregularity. As mentioned above, a long drop-off occurs when the emergency system 105 detects that a provider has remained within a threshold distance of a drop-off location associated with a completed transportation request for more than a threshold amount of time.

In one or more embodiments, a long drop-off can indicate a potential emergency. For example, a long drop-off can indicate that a provider is experiencing car problems. Alternatively, a long drop-off can indicate that a provider and/or requestor has come in contact with a bad actor. Regardless of the circumstances of the long drop-off, in response to detecting a long drop-off, the emergency system 105 can generate an emergency assistance user interface for a requestor or provider that provides various emergency and/or communication options.

As shown in FIG. 3D, the emergency system 105 can detect a long drop-off by determining that a provider client device (e.g., the provider client device 110) has remained within a threshold distance 370a, indicated by the circumference 374a, from the selected drop-off 372a associated with the completed transportation request for more than a threshold amount of time. For example, in response to detecting that a requestor associated with a transportation request has been dropped off at the selected drop-off 372a (e.g., based on transportation signals from the requestor client device 116 and/or the provider client device 110), and that a provider client device 110 associated with the transportation request has remained within the circumference 374a for more than five minutes from the drop-off time, the emergency system 105 can generate and provide an emergency assistance user interface to one or both of the requestor client device 116 and the provider client device 110.

FIG. 3E illustrates an example of an unexpected drop-off. As mentioned above, an unexpected drop-off occurs when a requestor is dropped off at a location that is more than a threshold distance from a destination or drop-off location specified in a transportation request. In one or more embodiments, an unexpected drop-off can indicate a potential emergency. For example, an unexpected drop-off can indicate that a provider and/or requestor has come in contact with a bad actor. As with the other types of transportation irregularities discussed herein, the emergency system 105 can generate and provide an emergency assistance user interface to a requestor client device and/or a provider client device in response to detecting an unexpected drop-off.

As shown in FIG. 3E, the emergency system 105 can detect an unexpected drop-off in response to detecting an actual drop-off 376 has occurred at or more than a threshold distance 370b, indicated by the circumference 374b, from the selected drop-off 372b associated with the completed transportation request. For example, in response to detecting that a requestor 120 associated with a transportation request has been dropped off at the actual drop-off 376 (e.g., detected based on transportation signals from the requestor client device 116 and/or the provider client device 110), and that the actual drop-off 376 is at or more than a threshold distance 370b from the selected drop-off 372b, the emergency system 105 can generate and provide an emergency assistance user interface for display by one or both of the requestor client device 116 and the provider client device 110.

To further illustrate, the emergency system 105 can determine a distance between the selected drop-off 372b and the actual drop-off 376 by receiving current location information from the requestor client device 116, and comparing the current location information with the selected drop-off 372b. In at least one embodiment, the emergency system 105 receives the current location information from the requestor client device 116 at a time corresponding with completion of the transportation associated with the transportation request (e.g., at the time of drop-off). If the comparison indicates that the actual drop-off 376 has occurred at or more than a threshold distance 370b from the selected drop-off 372b associated with the completed transportation request, the emergency system 105 determines that an unexpected drop-off has occurred.

Figure 4B:
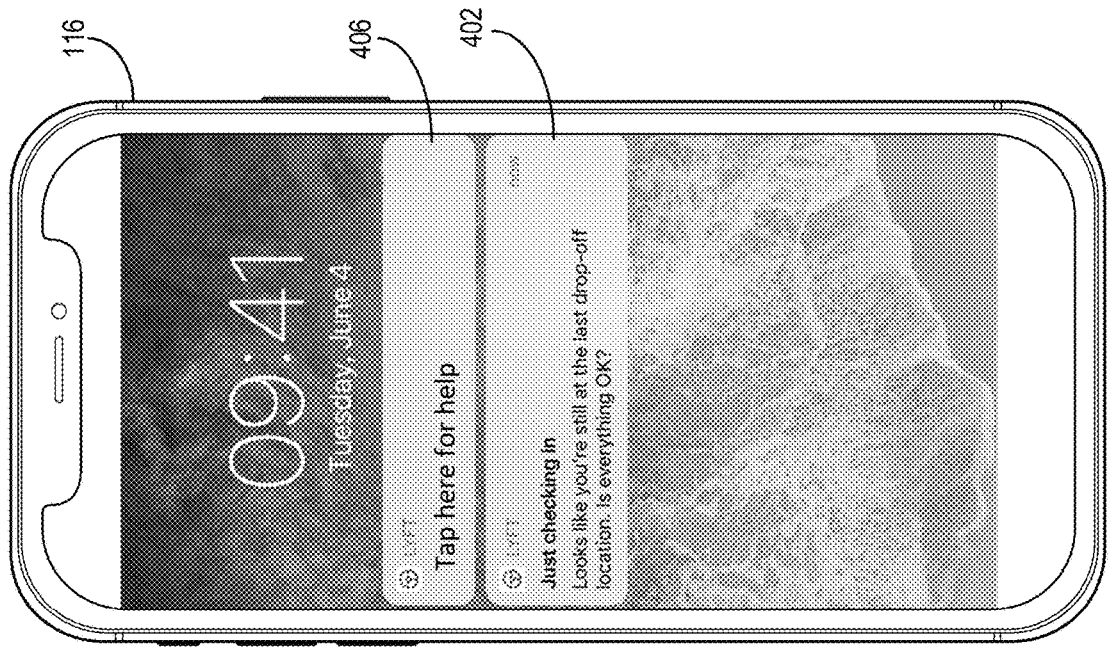
Figure 4A:
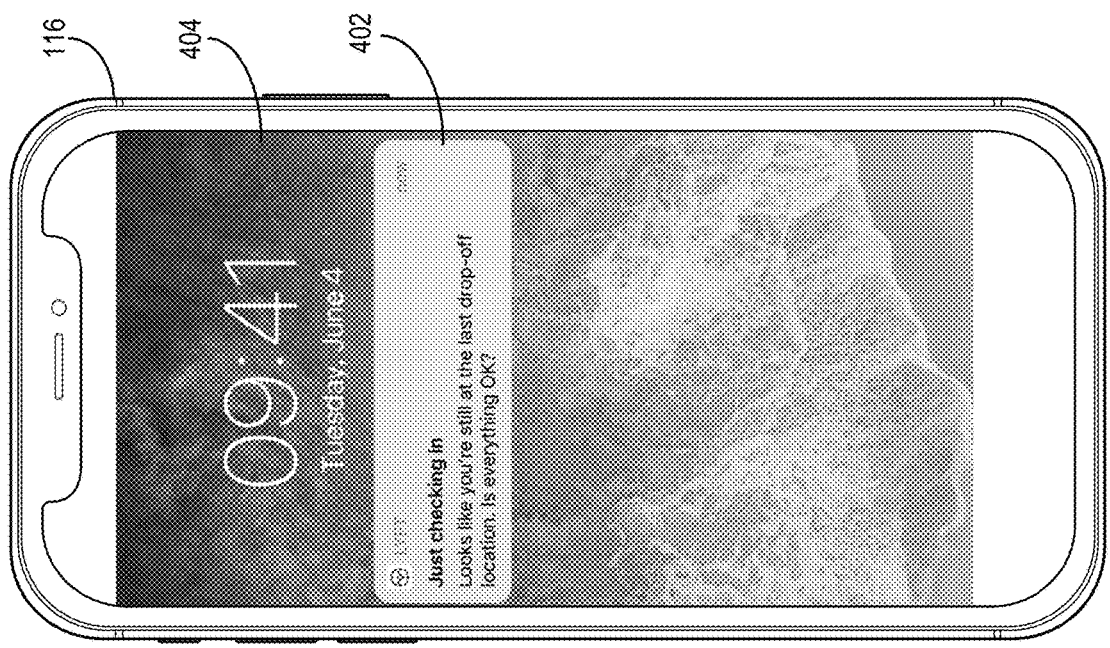

As mentioned above, the emergency system 105 generates and provides push notifications and emergency assistance user interfaces based on transportation signals and determined emergency severity levels associated with transportation requests. FIGS. 4A-5G illustrate example push notifications and emergency assistance user interfaces generated by the emergency system 105. For example, FIG. 4A shows a first push notification 402 provided by the emergency system 105 on the lock screen 404 of the requestor client device 116. As discussed above, the emergency system 105 can generate the first push notification 402 to include text associated with a detected transportation irregularity in connection with the requestor client device 116. After detecting no user interaction with the first push notification 402 for a threshold amount of time, the emergency system 105 can additionally generate and provide a second push notification 406, as shown in FIG. 4B. As discussed above, the emergency system 105 can generate the second push notification 406 to include more persuasive language associated with the detected transportation irregularity.

In response to a detected user interaction with the first push notification 402 or the second push notification 406, the emergency system 105 can generate and provide an emergency assistance user interface based on the detected transportation irregularity. For example, as shown in FIG. 4C, the emergency system 105 can generate the emergency assistance user interface 408 including various communication and emergency options. In one or more embodiments, the emergency system 105 can include the communication option 410 as part of the emergency assistance user interface 408. In response to a detected selection of the communication option 410, the emergency system 105 can determine that the transportation irregularity is resolved and close any ticket information and/or case file associated with the transportation irregularity.

As further shown in FIG. 4C, the emergency system 105 can further generate the emergency assistance user interface 408 to include information 412 associated with the transportation irregularity. For example, the emergency system 105 can include information including an actual drop-off location versus a drop-off location specified by the transportation match, a current location of the requestor client device 116, a make and model of the transportation vehicle 108, a license plate number associated with the transportation vehicle 108, a name and profile picture associated with the provider 114, and/or any other information that might be useful in addressing a potential transportation emergency.

The emergency system 105 can further generate the emergency assistance user interface 408 to include the emergency options 414. For example, depending on the determined severity of the transportation irregularity and in response to a detected selection of the "Get Emergency Help" option, the emergency system 105 can immediately establish a communication session with the remote third-party system 122 in order to have emergency assistance dispatched to the location of the requestor client device 116. Alternatively, depending on the determined severity of the transportation irregularity and in response to a detected selection of the "Get Emergency Help" option, the emergency system 105 can provide additional options for the requestor 120 to either call or text the remote third-party system 122 in order to receive assistance.

The emergency system 105 can generate the emergency assistance user interface 408 in response to detecting a transportation irregularity relative to the requestor client device 116. In one or more embodiments, the emergency system 105 can generate a user interface with similar functionality in response to detecting a transportation irregularity relative to the provider client device 110. For example, as shown in FIG. 4D, the emergency system 105 can generate an emergency assistance overlay 409 including the emergency options 414 and the communication option 410. The emergency system 105 can then provide the emergency assistance overlay 409 on the provider client device 110 such that route guidance is still partially visible. For instance, the emergency system 105 can provide the emergency assistance overlay 409 in response to determining that the transportation vehicle 108 is still moving (e.g., the provider 114 is still driving).

Figure 4E:
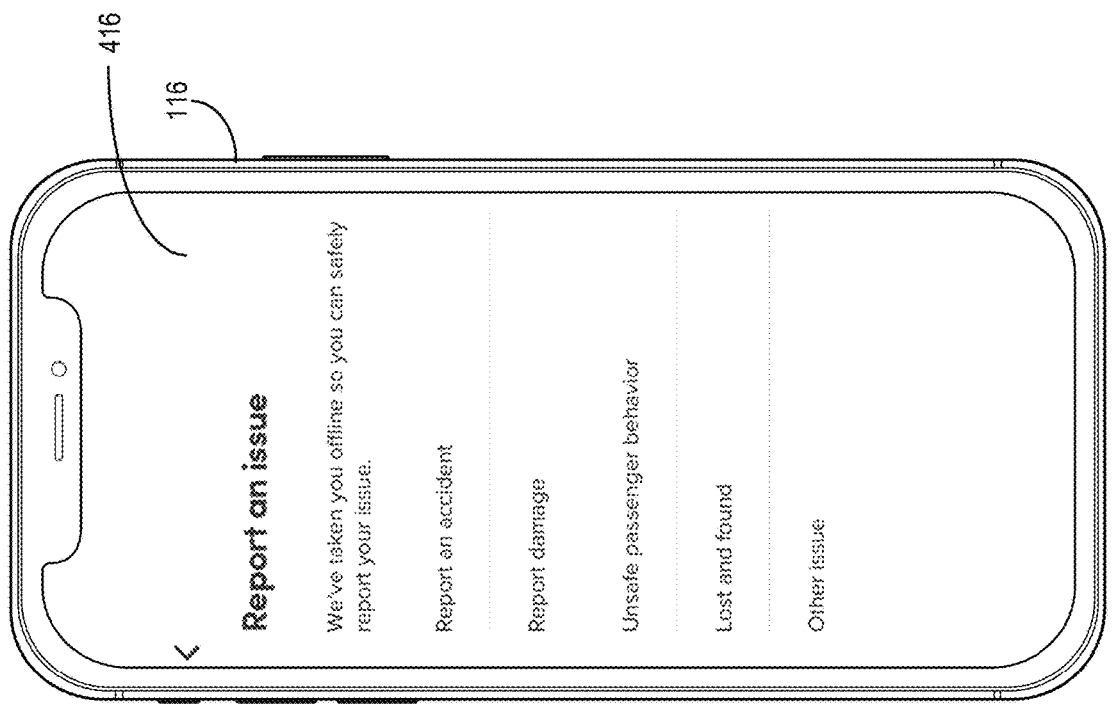

Additionally, depending on the determined severity of the transportation irregularity and in response to a detected selection of the "Report an Issue" option (e.g., via the emergency assistance user interface 408 or via the emergency assistance overlay 409), the emergency system 105 can provide additional reporting options. For example, as shown in FIG. 4E, the emergency system 105 can generate and provide the issue reporting user interface 416. In response to a detected selection of any of the options within the issue reporting user interface 416, the emergency system 105 can generate an issue report associated with an accident, vehicle damage, interpersonal problems, lost and found items, and other types of issues.

Figure 5B:
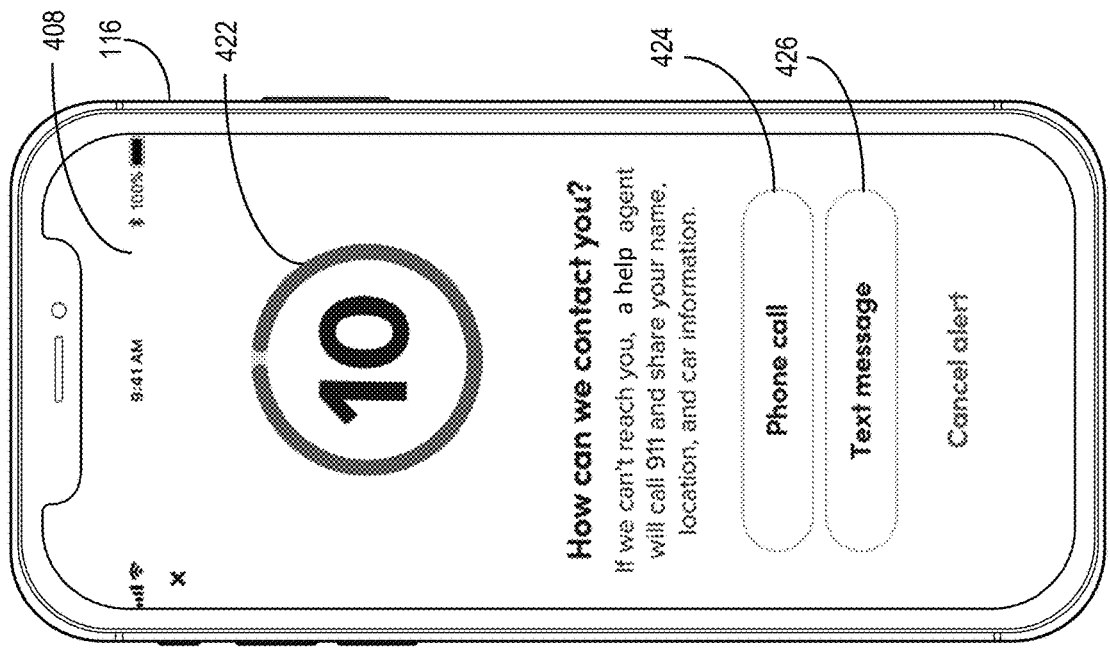
FIGS. 5A-5T illustrate example graphical user interfaces generated by the emergency system in accordance with one or more embodiments.
Figure 5A:
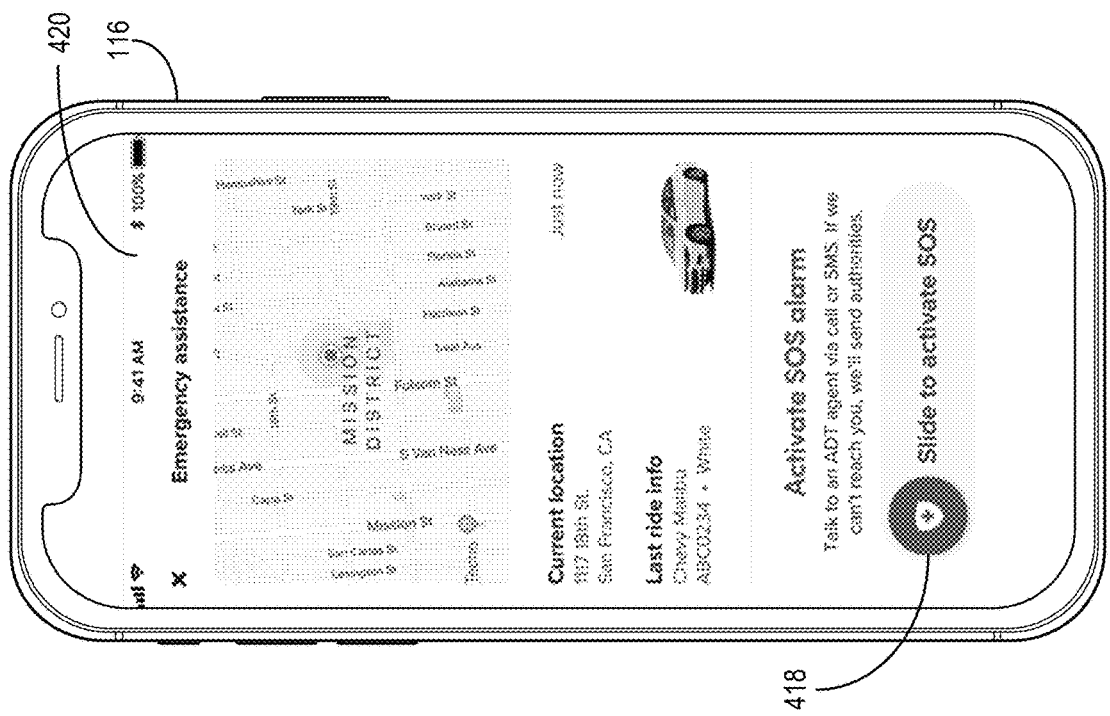
Figure 5D:
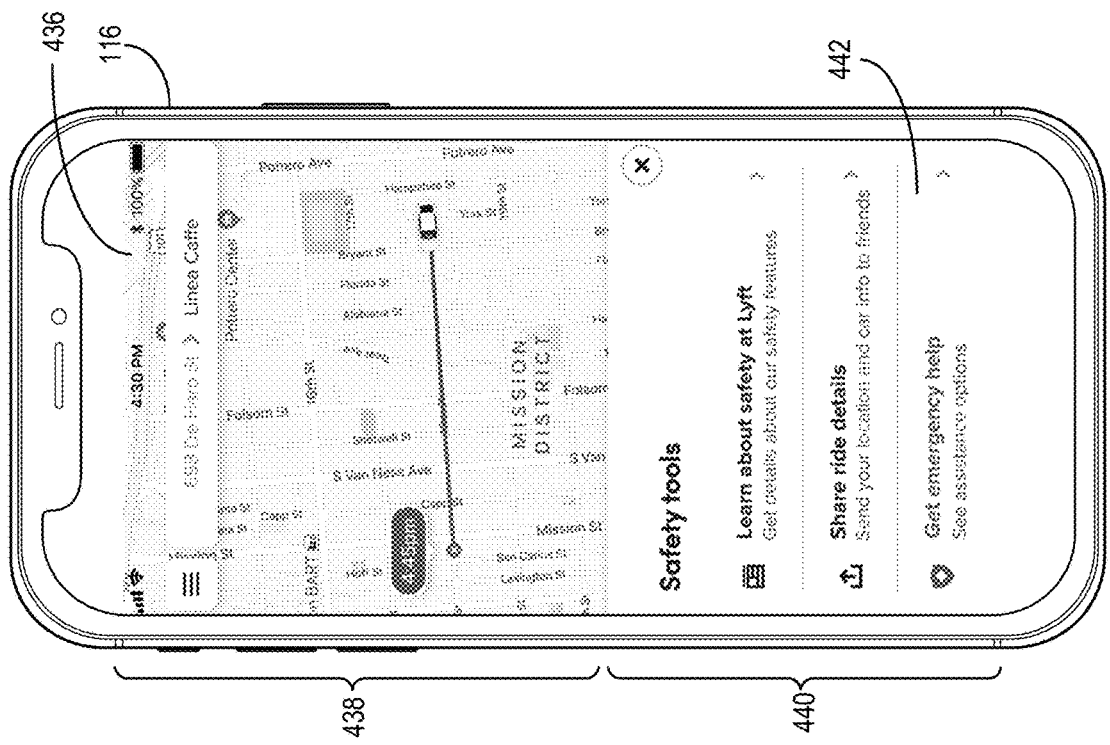

In one or more embodiments, the emergency system 105 can provide emergency assistance directly through the client application (e.g., the provider application 112 or the requestor application 118) installed on the client device (e.g., the provider client device 110 or the requestor client device 116). FIGS. 5A-5T illustrate additional detail regarding the communication and emergency options provided by the emergency system 105 via a client application. For example, as shown in FIG. 5A, the requestor application 118 can provide the emergency options user interface 420 including an emergency activation option 418, along with other information associated with the current transportation. In one or more embodiments, the emergency system 105 can provide the emergency activation option 418 within the emergency options user interface 420 in response to detecting a transportation irregularity associated with the current transportation.

In response to a detected selection of the emergency activation option 418, the emergency system 105 can determine a severity associated with the determined transportation irregularity and generate an emergency assistance user interface based on the determined severity. For example, as shown in FIG. 5B, the emergency system 105 can generate the emergency assistance user interface 408 including the countdown timer emergency option 422, the phone call communication option 424, and the text message communication option 426. In one or more embodiments, the emergency system 105 generates the emergency assistance user interface 408 including the countdown timer emergency option 422 in response to determining a high severity associated with the detected transportation irregularity. In at least one embodiment, in response to determining that countdown timer emergency option 422 has expired (e.g., has count down to zero), the emergency system 105 can determine the current location of the requestor client device 116, and can configure an emergency communication instructing the remote third-party system 122 to dispatch emergency services to the current location of the requestor client device 116.

In another embodiment, the emergency system 105 can generate the emergency assistance user interface 408 without the countdown timer emergency option 422 in response to determining a lesser severity level associated with the transportation irregularity. For example, in response to determining a moderate or low severity level associated with the detected transportation irregularity, the emergency system 105 can generate the emergency assistance user interface 408 including only the phone call communication option 424 and the text message communication option 426. In response to a detected selection of either communication options 424, 426, the emergency system 105 can provide additional user interface elements associated with the selected option.

Figure 5C:
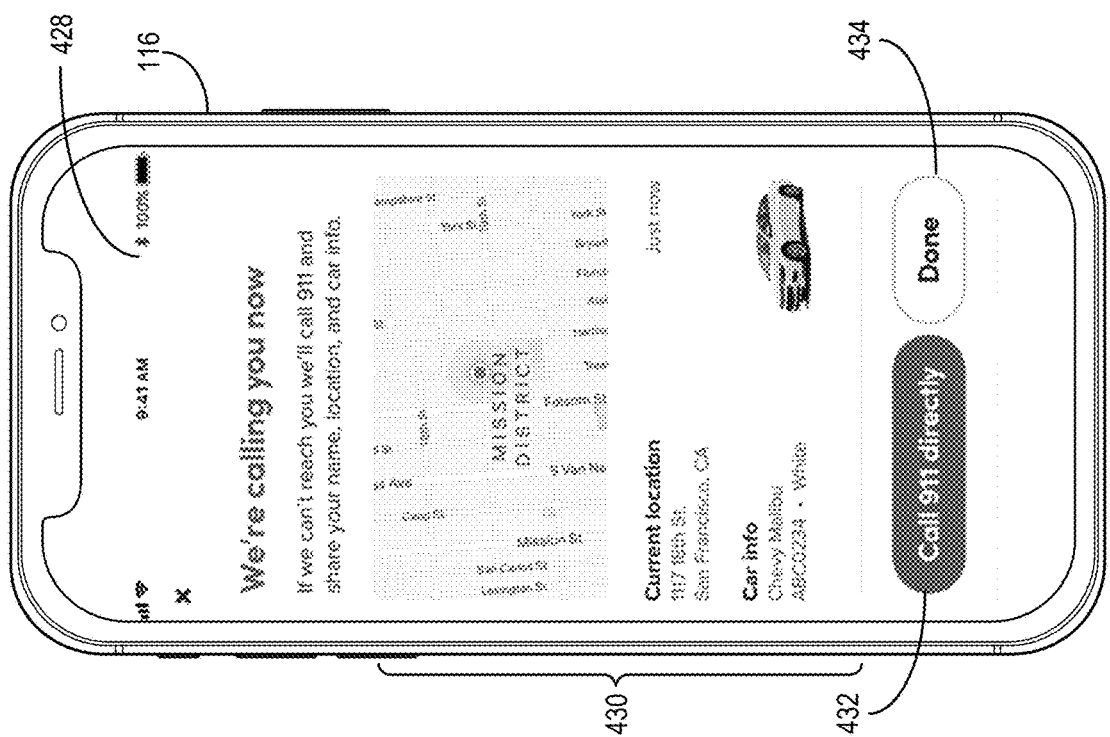

For example, in response to a detected selection of the phone call communication option 424, the emergency system 105 can generate and provide the phone call user interface 428, as shown in FIG. 5C. The emergency system 105 can generate the phone call user interface 428 including transportation information 430 (e.g., such that the requestor 120 has quick access to their current location, the make and model of the transportation vehicle 108, etc.), the direct call option 432, and the done option 434. In response to a detected selection of the direct call option 432, the emergency system 105 can directly route a phone call from the requestor client device 116 to publicly available emergency services (e.g., 911 emergency services). In response to a detected selection of the done option 434, the emergency system 105 can establish a communication session with the remote third-party system 122 in order for the remote third-party system 122 to contact the requestor client device 116 and further assist with the transportation irregularity.

In other embodiments, in response to a detected selection of the text message communication option 426, the emergency system 105 can provide additional options enabling a text message exchange between the requestor client device 116 and either the emergency system 105 or the remote third-party system 122. In one or more embodiments, the emergency system 105 can customize the options provided to the requestor client device 116 based on one or more of the transportation irregularity, a determined severity of the transportation irregularity, and user option selections.

FIGS. 5D-5G illustrate another example embodiment of the emergency system 105. For example, as shown in FIG. 5D, the emergency system 105 can provide safety options 440 in connection with a location map 438 on the transportation graphical user interface 436 provided to the requestor client device 116 during on-going transportation (e.g., while the requestor 120 is traveling in the transportation vehicle 108). As further shown in FIG. 5D, the safety options 440 can include an emergency help option 442.

In response to a detected selection of the emergency help option 442, the emergency system 105 can provide emergency contact options. For example, as shown in FIG. 5E, the emergency system 105 can generate and provide the emergency contact graphical user interface 444 including the communication options 446a, 446b, and 446c, and the help slider 448. In at least one embodiment, in response to a detected selection of one of the communication options 446a-446c followed by a selection of the help slider 448, the emergency system 105 can determine an emergency severity associated with the current transportation (e.g., as discussed above). The emergency system 105 can then generate additional graphical user interfaces based on the determined severity. In at least one embodiment, by detecting the combined selection of one of the communication options 446a-446c and the help slider 448, the emergency system 105 can avoid providing emergency assistance to a requestor 120 who accidentally selected an emergency option.

Figure 5F:
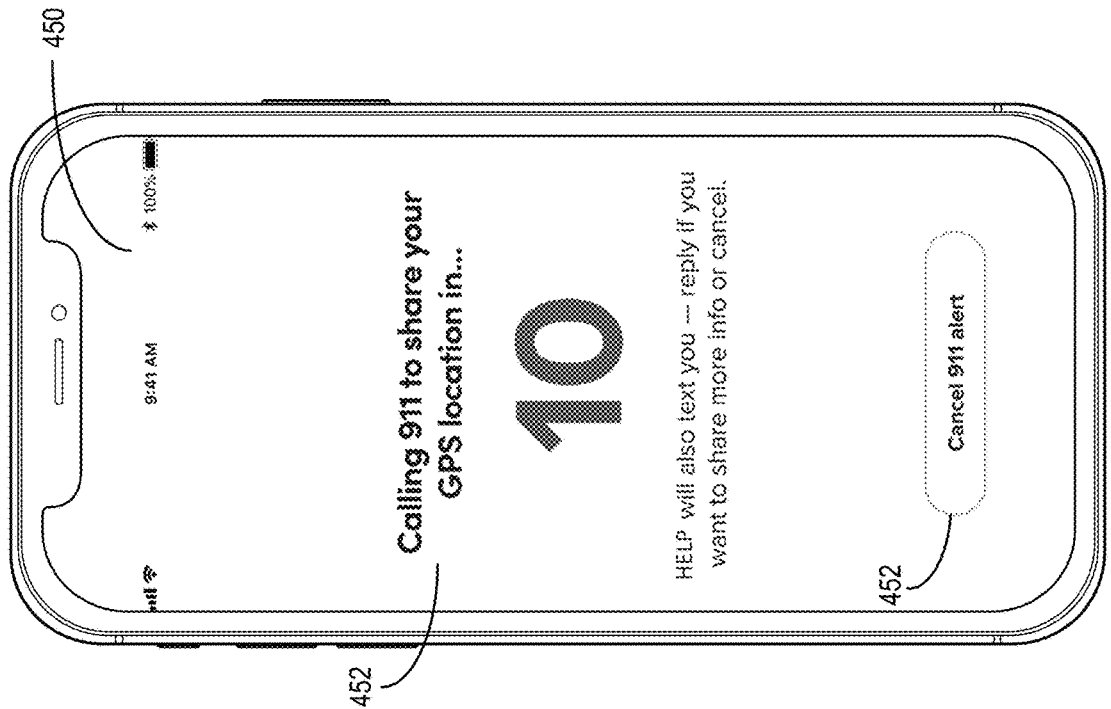
Figure 5E:
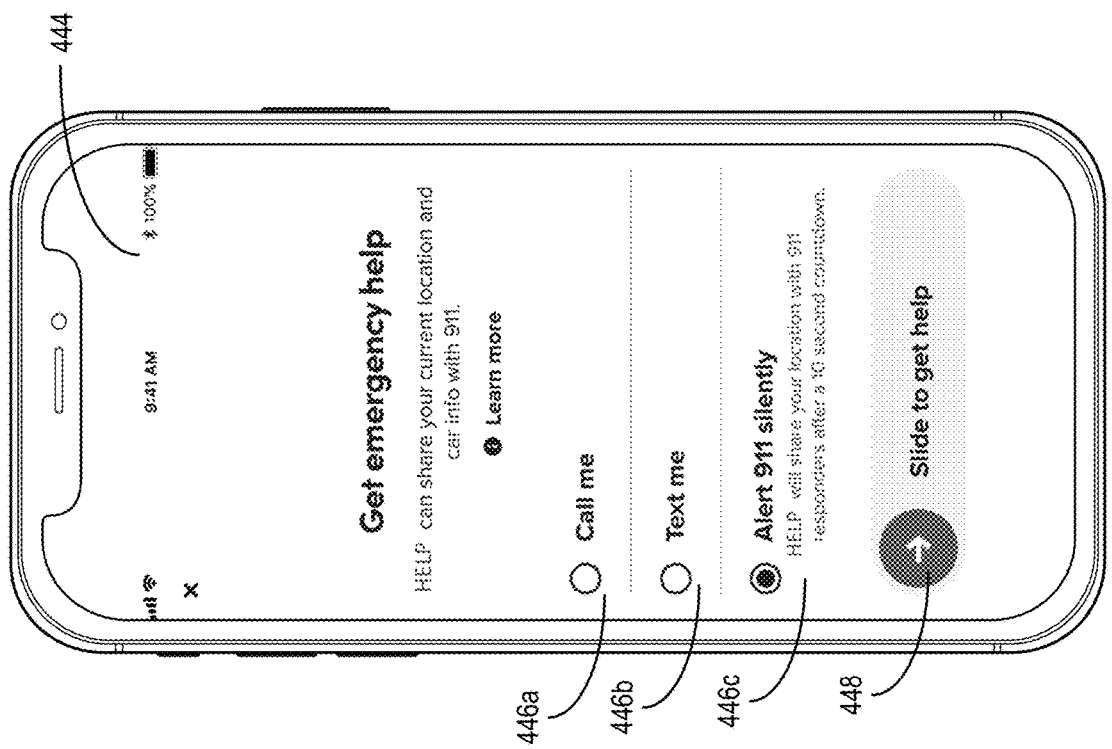

As further shown in FIG. 5F, in response to a detected selection of the communication option 446c and the help slider 448, the emergency system 105 can provide a countdown user interface 450. For example, the emergency system 105 can include a countdown 452 in the countdown user interface 450 to indicate to the requestor 120 an amount of time until 911 emergency services are provided with information associated with the current transportation. The emergency system 105 can cancel the current transportation emergency in response to a detected selection of the cancel button 454.

In one or more embodiments, the emergency system 105 can provide haptic feedback via the requestor client device 116 to confirm the detected user selections. For example, in response to the detected selection of the communication option 446c and the help slider 448 (e.g., as the countdown user interface 450 is provided), the emergency system 105 can provide haptic feedback such as a vibration or pattern of vibrations via the requestor client device 116. In one or more embodiments, this haptic feedback confirms to the requestor 120 that the emergency system 105 is working to resolve the current transportation emergency.

In additional or alternative embodiments, the emergency system 105 can provide haptic feedback at any other point in the transportation emergency workflow. For example, the emergency system 105 can provide haptic feedback in response to a detected selection of the emergency help option 442, as shown in FIG. 5D. The emergency system 105 can also provide haptic feedback in response to the countdown 452 expiring, as shown in FIG. 5F. In at least one embodiment, the haptic feedback can further alert the requestor 120 of a potential accidental selection or activation of an emergency option.

As shown in FIG. 5G, in response to the countdown 452 expiring (e.g., counting down to zero), the emergency system 105 can provide the transportation graphical user interface 436 overlaid with help information 456 and additional transportation information 458 in connection with the location map 438. In at least one embodiment, the emergency system 105 provides the help information 456 in connection with remote third-party system 122. In one or more embodiments, the emergency system 105 and/or the remote third-party system 122 can do any of the following in combination (depending on the emergency severity and the user-selected options): call emergency services, call the requestor client device 116, text the requestor computing device. Although these features are illustrated in FIGS. 4A-5G in connection with the requestor client device 116, in other embodiments, the emergency system 105 can provide the same functionality in connection with the provider client device 110.

Figure 5J:
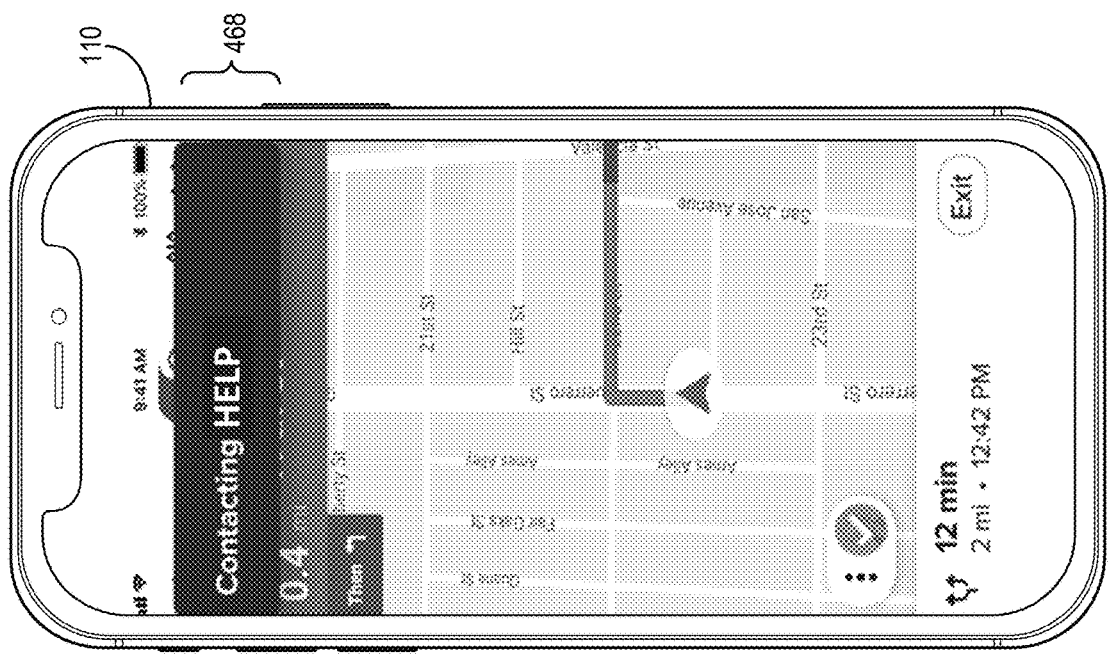
Figure 5I:
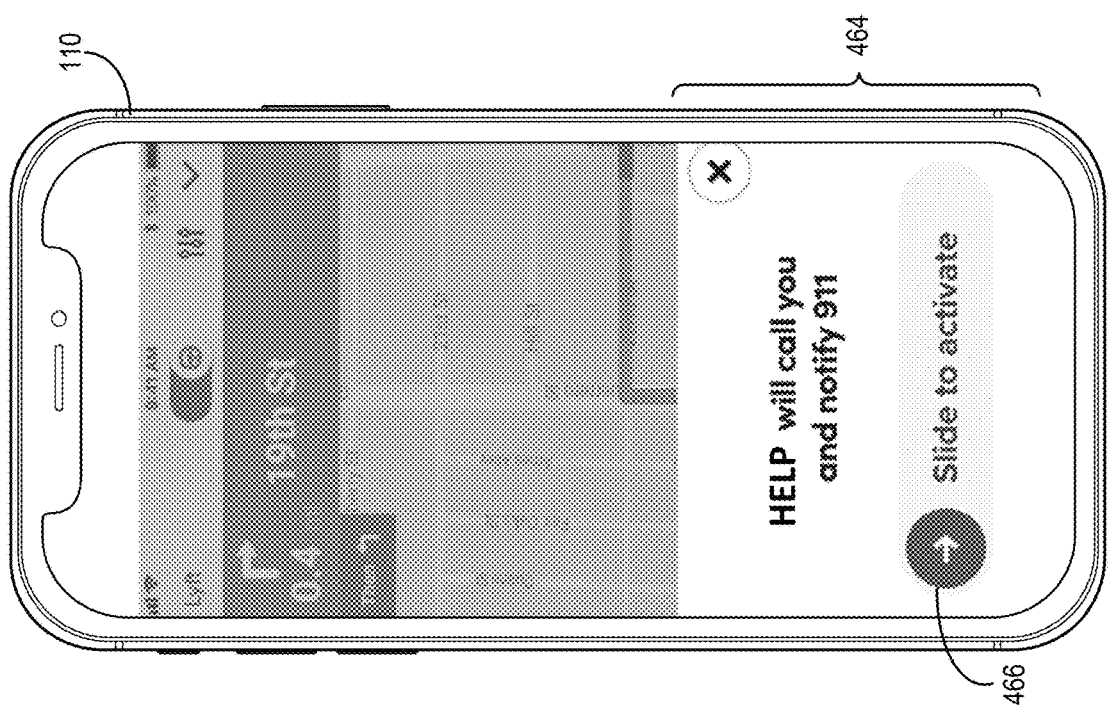
Figure 5L:
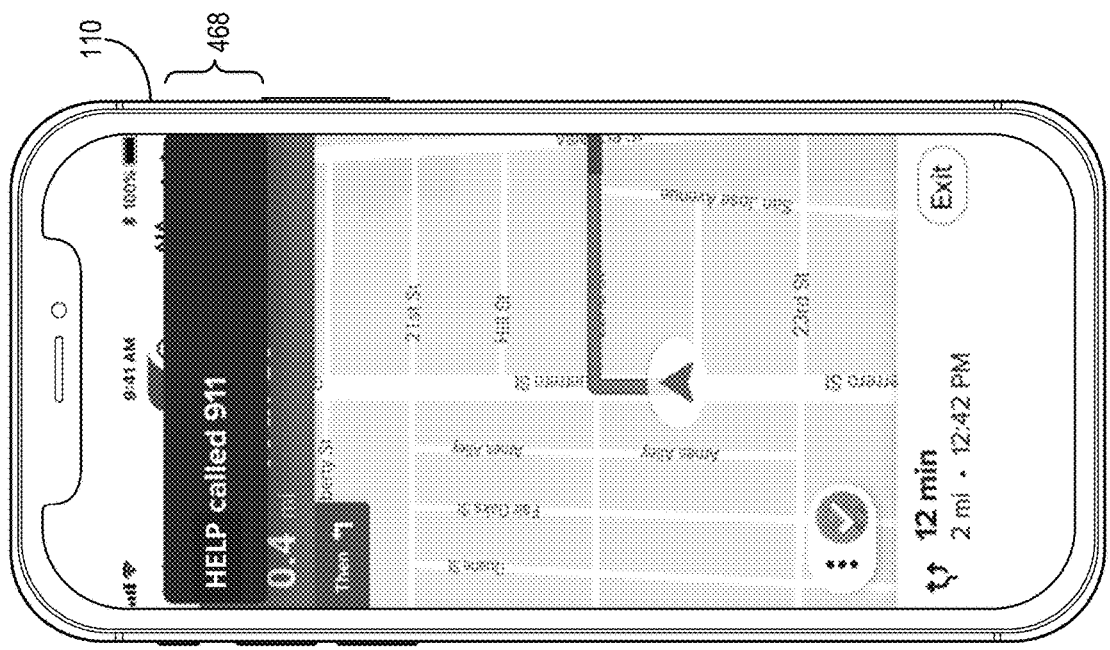
Figure 5K:
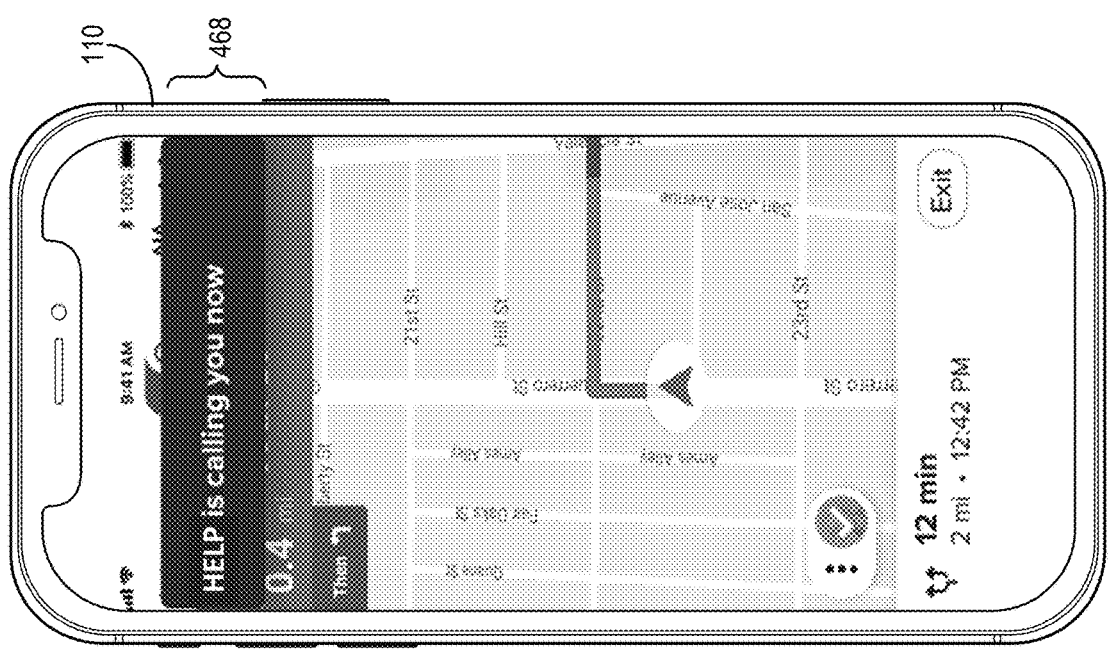
Figure 5N:
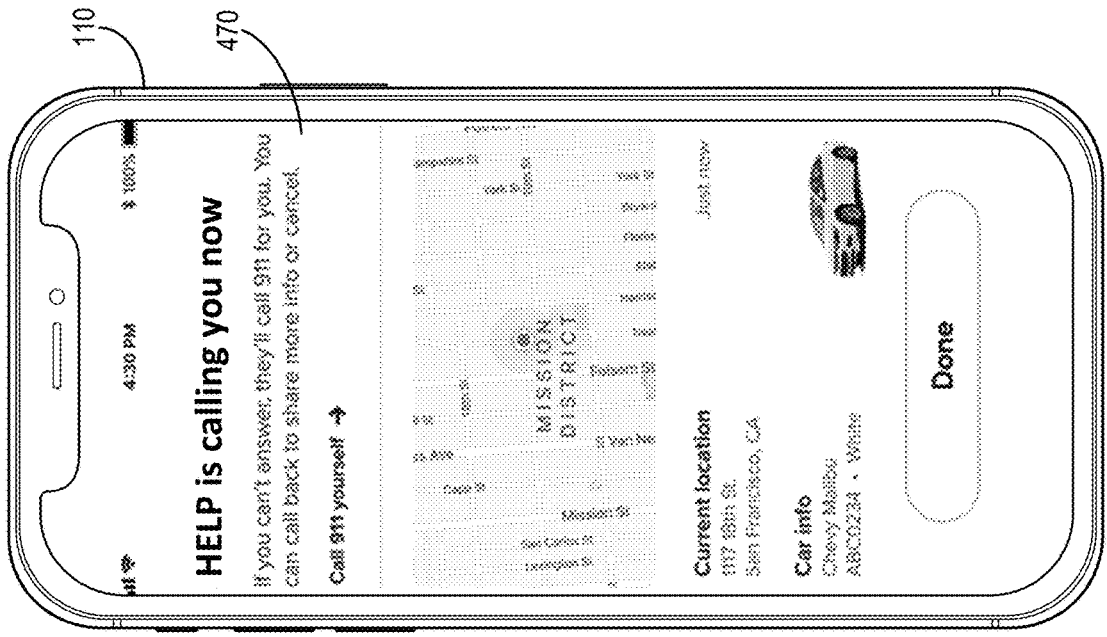
Figure 5M:
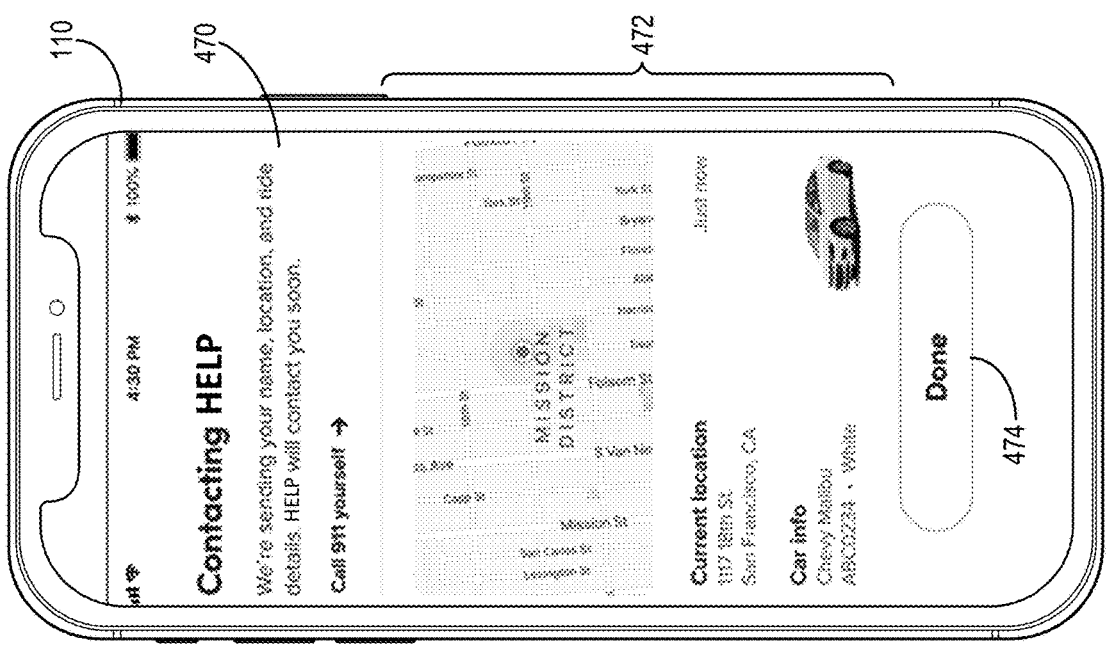
Figure 5O:
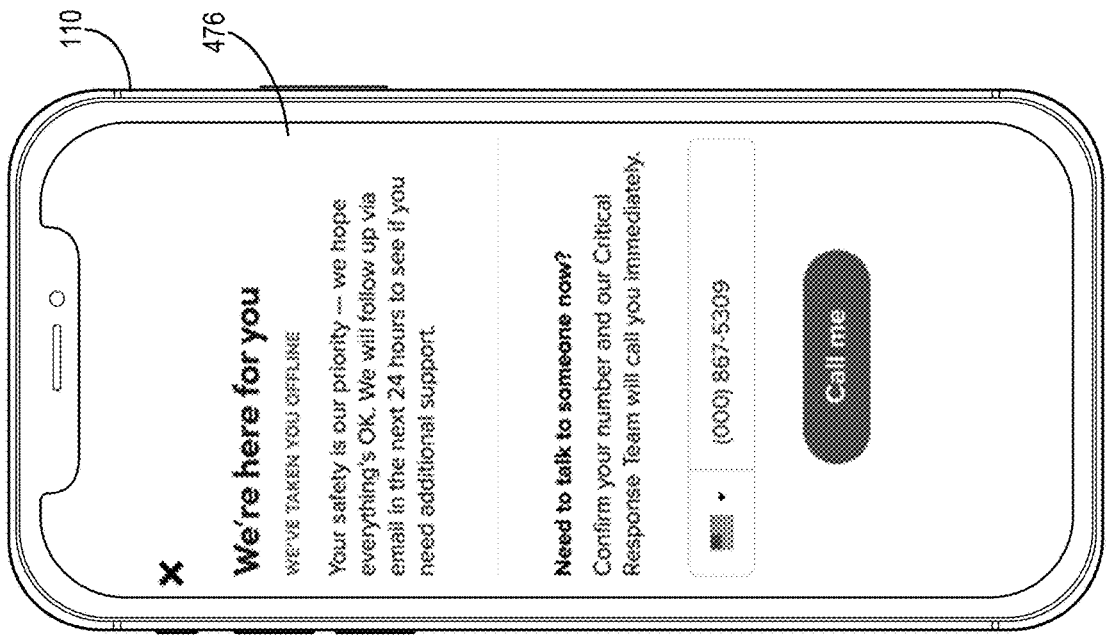

FIGS. 5H-5O illustrate the emergency system 105 generating additional user interfaces for the provider client device 110. In one or more embodiments, the emergency system 105 can generate user interfaces for the provider client device 110 based on whether the transportation vehicle 108 is moving (e.g., based on whether the provider 114 is driving). For example, and as will be discussed in greater detail below, FIGS. 5H-5L illustrate user interfaces generated by the emergency system 105 for the provider client device 110 based on detecting the transportation vehicle 108 moving, and FIGS. 5M-5O illustrate user interfaces generated by the emergency system 105 for the provider client device based on detecting the transportation vehicle 108 stopped.

In more detail, in response to detecting a transportation irregularity associated with the provider client device 110 and determining that the transportation vehicle 108 moving, the emergency system 105 can generate and provide the overlay 460 including the emergency help option 462. The emergency system 105 can further position the overlay 460 such that route guidance is still visible on the provider client device 110.

In response to a detected selection of the emergency help option 462, and based on the continued detection of movement in connection with the transportation vehicle 108, the emergency system 105 can generate and provide the emergency activation overlay 464, as shown in FIG. 5I. For example, the emergency system 105 can generate the emergency activation overlay 464 including text (e.g., "Help will call you and notify 911") based on the severity level associated with the detected transportation irregularity. Additionally, the emergency system 105 generates the emergency activation overlay 464 including the slider 466.

In response to a detected selection or interaction with the slider 466, the emergency system 105 can remove the overlay 464 and provide periodic notifications associated with the remote third-party system 122. For example, as shown in FIGS. 5J-5L, as the emergency system 105 generates and provides an emergency communication to the remote third-party system 122, and then receives information from the remote third-party system 122, the emergency system 105 can provide and update a notification 468 on the provider client device 110. As shown, the emergency system 105 can update the notification 468 to indicate that the emergency communication has been sent to the remote third-party system 122 (e.g., "Contacting Help"), that the remote third-party system 122 is attempting to contact the provider client device 110 (e.g., "Help is calling you now"), and that the remote third-party system 122 is contacting additional emergency resources (e.g., "Help is calling 911"). In one or more embodiments, the emergency system 105 can provide additional haptic feedback (e.g., a sound, a vibration) each time the notification 468 is updated. As shown, the emergency system 105 can position the notification 468 such that route guidance is still visible via the provider client device 110.

While FIGS. 5H-5L illustrate user interfaces generated by the emergency system 105 in response to detected movement of the transportation vehicle 108, the emergency system 105 can generate additional user interfaces including similar functionality in response to determining that the transportation vehicle 108 has stopped moving. For example, as shown in FIG. 5M, in response to a detected selection of the emergency help option 462 (e.g., as shown in FIG. 5H) and based on detecting that the transportation vehicle 108 is not moving, the emergency system 105 can generate and provide the provider emergency assistance user interface 470.

As shown, the emergency system 105 generate the provider emergency assistance user interface 470 to include text associated with the remote third-party system 122, text associated with the detected transportation irregularity, and additional information 472 associated with the transportation match. For example, the additional information 472 can include a map showing the current location of the provider client device 110 and/or the transportation vehicle 108, an address associated with the current location of the provider client device 110 and/or the transportation vehicle 108, and a description of the transportation vehicle 108.

The emergency system 105 can further generate the provider emergency assistance user interface 470 to include the button 474. In one or more embodiments, the emergency system 105 can perform one or more actions in response to a detected selection of the button 474. For example, in response to a detected selection of the button 474, the emergency system 105 can remove the provider emergency assistance user interface 470 from the provider client device 110, can close a ticket associated with the detected transportation irregularity, and/or can generate and send an additional communication to the remote third-party system 122.

The emergency system 105 can update the provider emergency assistance user interface 470 in response to additional interactions with or communications from the remote third-party system 122. For example, as shown in FIG. 5N, the emergency system 105 can update the text of the provider emergency assistance user interface 470 in response to a communication indicating that the remote third-party system 122 is attempting to contact the provider client device 110 (e.g., "Help is calling you now"), and/or has called additional emergency services on behalf of the provider client device 110 (e.g., "Help called 911").

Figure 5P:
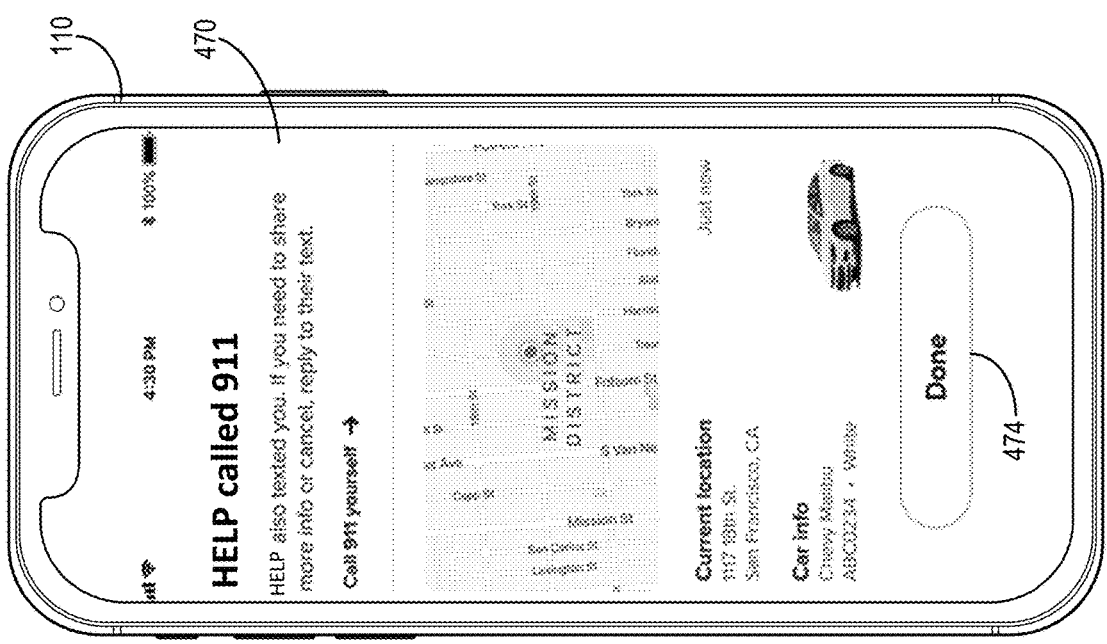
Figure 5R:
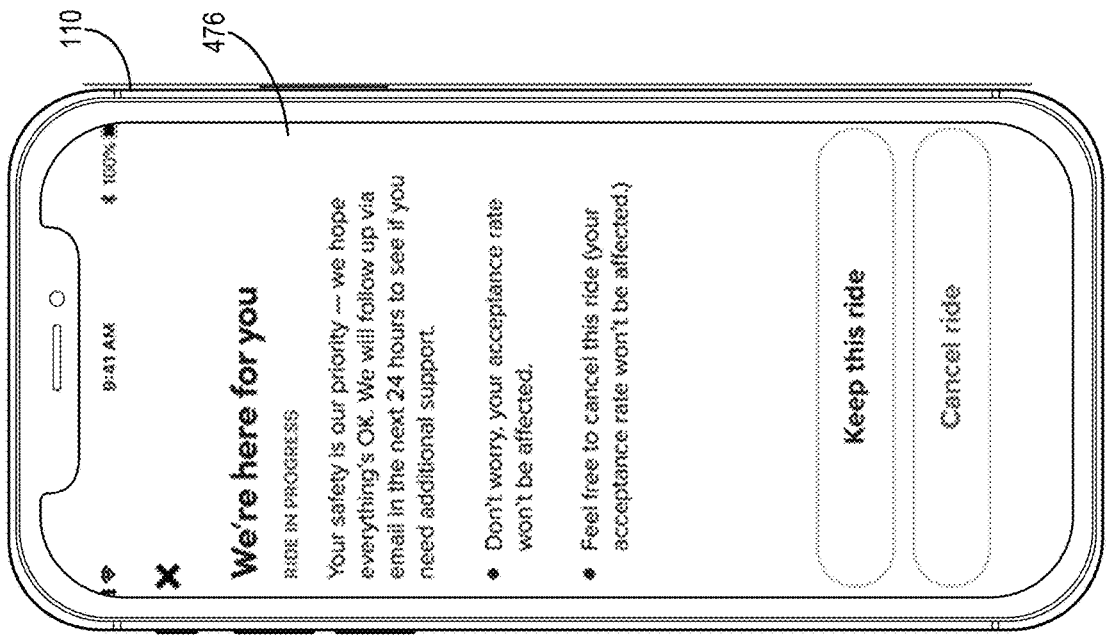
Figure 5Q:
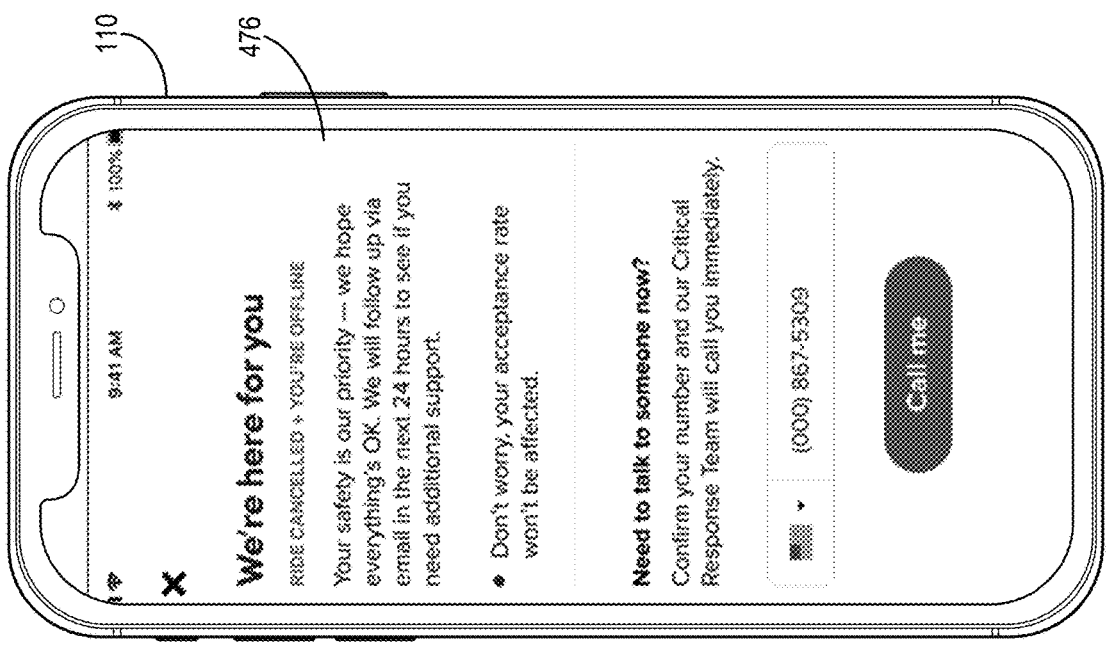
Figure 5T:
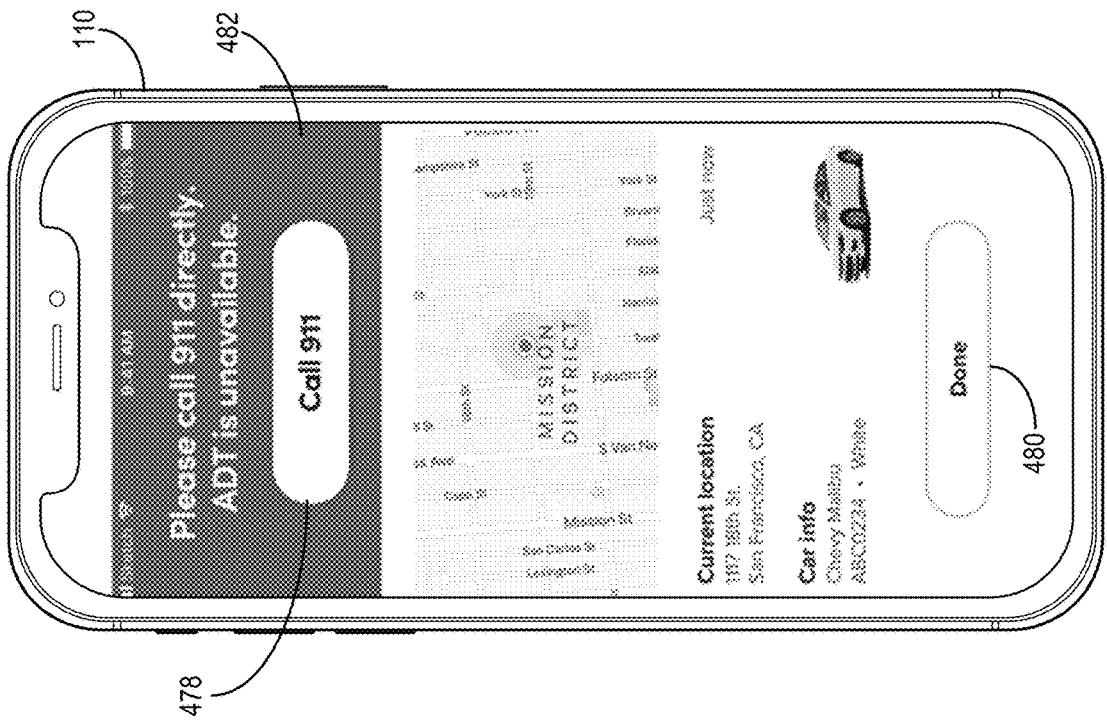

In one or more embodiments and as shown in FIGS. 5P, 5Q, and 5R, the emergency system 105 can provide an additional information user interface 476 in response to a detected selection of the button 474. For example, as shown in FIG. 5P, the emergency system 105 can update the text of the additional information user interface 476 to reflect additional actions performed by the emergency system 105 based on the severity level of the detected transportation irregularity. For example, the emergency system 105 can take the provider client device 110 offline in response to detecting a transportation irregularity with a moderate severity level. As shown in FIG. 5P, the emergency system 105 can further update the text of the additional information user interface 476 to reflect that the provider client device 110 is offline, and additional information and options (e.g., a "call me now" option) associated with the disposition of the transportation irregularity.

Additionally, the emergency system 105 can take the provider client device 110 offline and can cancel the current transportation match in response to detecting a transportation irregularity with a high severity level. As shown in FIG. 5Q, the emergency system 105 can further update the text of the additional information user interface 476 to reflect these outcomes, and to provide additional information and options associated with the disposition of the transportation irregularity. Moreover, the emergency system 105 can leave the provider client device 110 online in response to detecting a transportation irregularity with a low severity level. As shown in FIG. 5R, the emergency system 105 can further update the text of the additional information user interface 476 to include information regarding the disposition of the transportation irregularity, and to provide additional options that allow the provider 114 to continue with the current transportation match or to cancel the current transportation match.

Figure 5S:
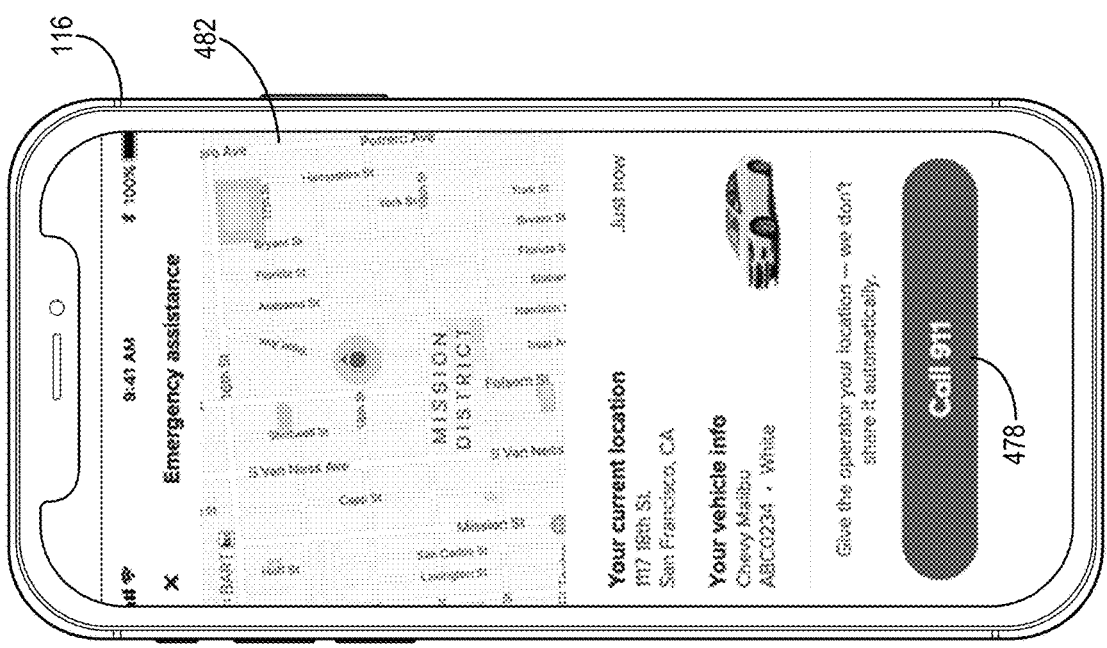

In one or more embodiments, the remote third-party system 122 may be unavailable (e.g., due to connectivity problems, due to system backlog). In at least one embodiment, in response to determining that the remote third-party system 122 is unavailable (e.g., in response to receiving a communication from the remote third-party system 122 indicating that the remote third-party system 122 cannot contact the provider client device 110 and/or the requestor client device 116), the emergency system 105 can generate and provide a fallback user interface 482. For example, as shown in FIG. 5S (in connection with the requestor client device 116), the emergency system 105 can generate and provide the fallback user interface 482 including information associated with the location of the requestor client device 116 and the transportation irregularity. The emergency system 105 can further generate the fallback user interface 482 including the call 911 option 478. In response to a detected selection of the call 911 option 478, the emergency system 105 can cause the requestor client device 116 to initiate a voice call to a 911 operator.

In another embodiment, as shown in FIG. 5T (in connection with the provider client device 110), the emergency system 105 can generate and provide the fallback user interface 482 including the call 911 option 478 and a done option 480. In response to a detected selection of the done option 480, the emergency system 105 can perform one or more actions. For example, in response to a detected selection of the done option 480, the emergency system 105 can flag the associated transportation irregularity for one or more future follow-ups (e.g., via text or voice call), or can close a ticket associated with the transportation irregularity.

Figure 6:
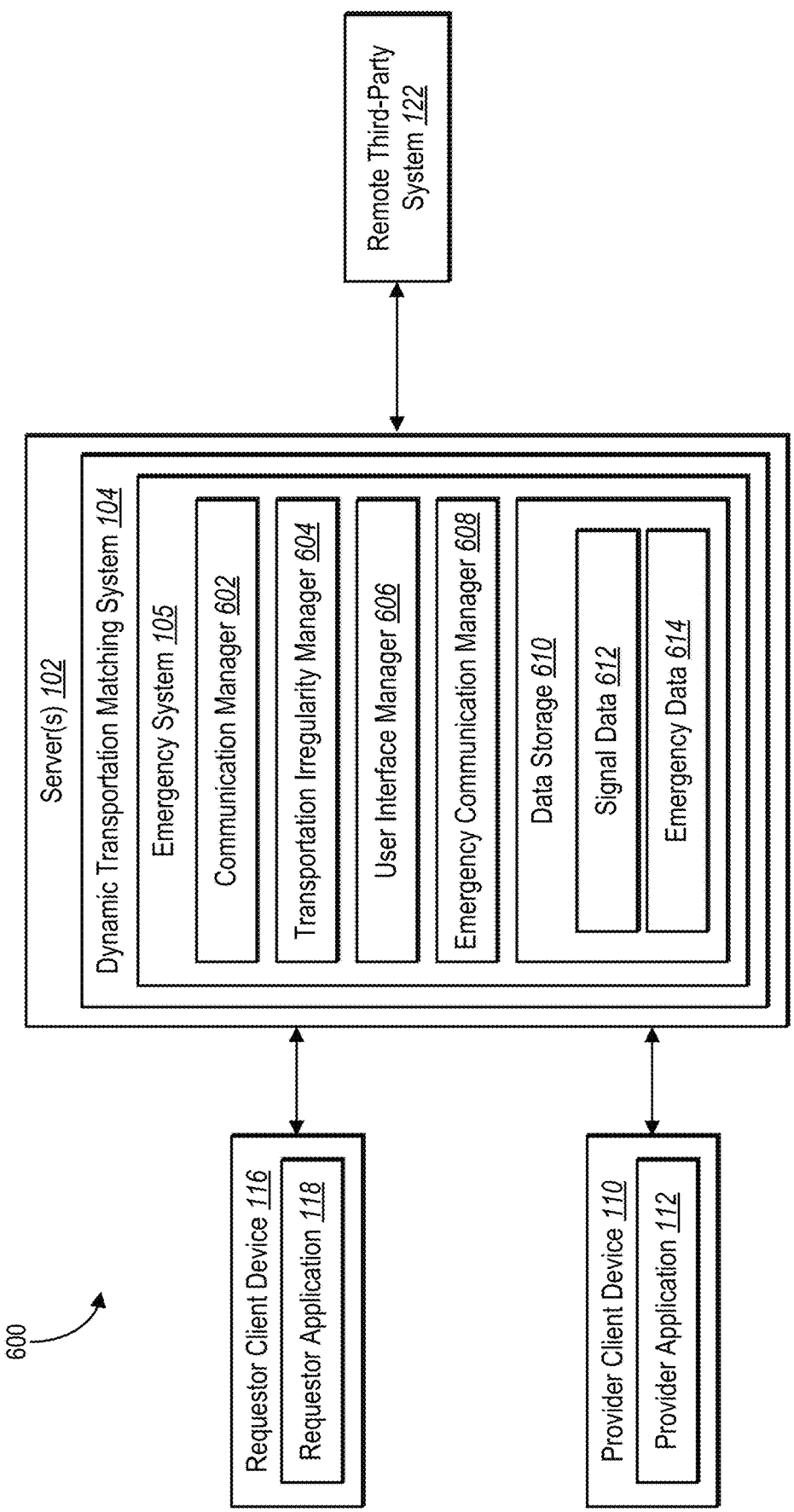
FIG. 6 illustrates a schematic diagram of the emergency system in accordance with one or more embodiments.

Turning now to FIG. 6, additional detail is provided regarding a computing system 600, including components and capabilities of the emergency system 105 in accordance with one or more embodiments. As shown, the emergency system 105 is implemented by the server(s) 102, including the dynamic transportation matching system 104. In some embodiments, the components of the emergency system 105 can be implemented by a single device (e.g., the server(s) 102, the requestor client device 116, the provider client device 110) or multiple devices. As shown, the emergency system 105 includes a communication manager 602, a transportation irregularity manager 604, a user interface manager 606, an emergency communication manager 608, and a data storage 610 including signal data 612 and emergency data 614. Each is discussed in turn below.

As just mentioned, and as shown in FIG. 6, the emergency system 105 includes the communication manager 602. In one or more embodiments, the communication manager 602 handles all communications between the emergency system 105, the requestor client device 116, and the provider client device 110. For example, the communication manager 602 receives transportation signals from the provider client device 110 and the requestor client device 116, and provides emergency assistance user interfaces for the provider client device 110 and the requestor client device 116. Additionally, the communication manager 602 can also handle communications between the emergency system 105 and the dynamic transportation matching system 104. Moreover, the communication manager 602 can manage communications between the emergency system 105 and the remote third-party system 122.

As further shown in FIG. 6, the emergency system 105 includes the transportation irregularity manager 604. In one or more embodiments, the transportation irregularity manager 604 detects transportation irregularities and determines severities associated with the transportation irregularities. For example, the transportation irregularity manager 604 can receive transportation signals from the requestor client device 116 and/or the provider client device 110 relative to a transportation request (e.g., immediately following the transportation match, during transportation, or for a predetermined period of time following drop-off) and detect a transportation irregularity associated with the transportation. The transportation irregularity manager 604 can utilize a heuristics-based approach, a score-based approach, and/or a machine learning-based approach to detect a transportation irregularity associated with a transportation request (e.g., as described above with regard to FIG. 3A).

Moreover, the transportation irregularity manager 604 can determine a severity associated with a detected transportation irregularity. For example, the transportation irregularity manager 604 can utilize heuristics, emergency scores, and/or machine learning in connection with the received transportation signals to determine that the severity associated with a transportation irregularity is low, moderate, or high. Based on the determined severity level, the emergency system 105 can provide customized communication and emergency options to the client device experiencing the transportation irregularity.

Additionally, as shown in FIG. 6, the emergency system 105 includes the user interface manager 606. In one or more embodiments, the user interface manager 606 generates one or more push notifications and user interfaces for a client device based on a detected transportation irregularity and the determined severity associated with the transportation irregularity. For example, the user interface manager 606 can customize the text and selectable input options of an emergency assistance user interface depending on the determined emergency severity associated with a detected transportation irregularity. In at least one embodiment, the user interface manager 606 can further customize an emergency assistance user interface based on user profiles and dynamic transportation matching system account history associated with the requestor 120 and/or the provider 114.

As further shown in FIG. 6, the emergency system 105 includes the emergency communication manager 608. In one or more embodiments, the emergency communication manager 608 generates emergency communications to provide to the remote third-party system 122 based on one or more of the detected transportation irregularity, the determined severity of the detected transportation irregularity, and detected user interactions associated with generated push notifications and emergency assistance user interfaces. For example, depending on a determined severity of a transportation irregularity and/or detected user interactions on a client device, the emergency communication manager 608 can generate an emergency communication that, when routed to the remote third-party system 122, cause the remote third-party system 122 to generate a communication session (e.g., via SMS text, phone call, or other) between the remote third-party system 122, the emergency system 105, and/or the client device (e.g., the requestor client device 116 or the provider client device 110). The emergency communication manager 608 can generate the emergency communication to include information associated with the transportation request, the detected transportation irregularity, current information associated with the user device (e.g., current location, direction, speed), and information associated with the user (e.g., profile information associated with the requestor 120 or the provider client device 110).

The emergency system 105 also includes the data storage 610. In one or more embodiments, the data storage 610 includes the signal data 612. For example, the signal data 612 can include transportation signal information, such as described herein. Additionally, the data storage 610 includes the emergency data 614. For example, the emergency data 614 can include emergency information, such as described herein.

Each of the components of the computing system 600 can include software, hardware, or both. For example, the components of the computing system 600 can include one or more instructions stored on a computer-readable storage medium and executable by processors of one or more computing devices, such as a client device or a server device. When executed by the one or more processors, the computer-executable instructions of the emergency system 105 can cause the computing device(s) (e.g., the server(s) 102) to perform the methods described herein. Alternatively, the components of the computing system 600 can include hardware, such as a special-purpose processing device to perform a certain function or group of functions. Alternatively, the components of the computing system 600 can include a combination of computer-executable instructions and hardware.

Furthermore, the components of the computing system 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing system 600 may be implemented as a stand-alone application, such as a desktop or mobile application. Furthermore, the components of the computing system 800 may be implemented as one or more web-based applications hosted on a remote server.

Figure 7:
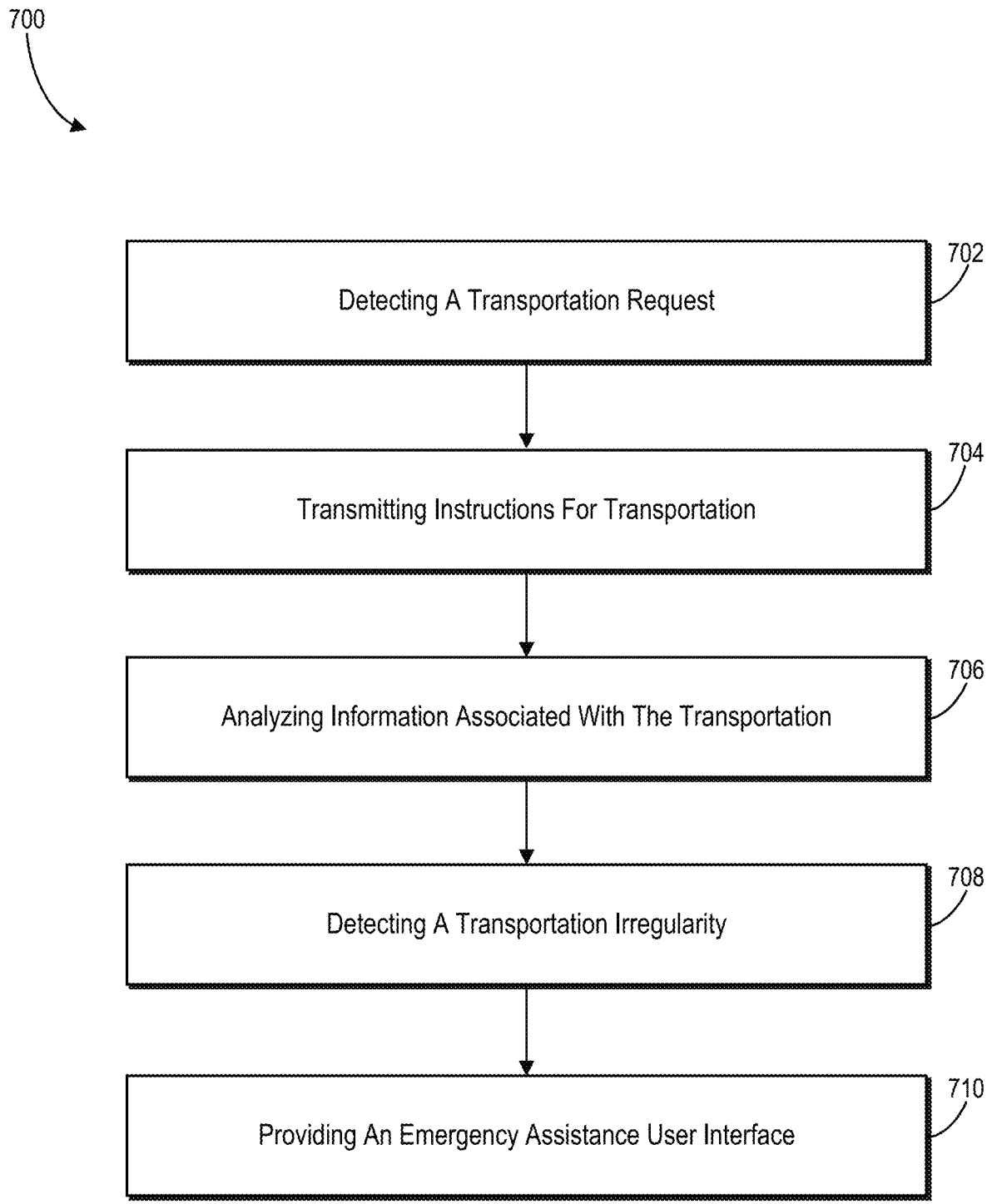
FIG. 7 illustrates a flowchart of a series of acts in a method of generating an emergency assistance user interface in accordance with one or more embodiments.

FIGS. 1-6, the corresponding text, and the examples provide several different systems, methods, techniques, components, and/or devices of the emergency system 105 in accordance with one or more embodiments. In addition to the above description, FIG. 7 illustrates a flowchart of a series of acts 700 for generating an emergency assistance user interface in accordance with one or more embodiments. The emergency system 105 may perform one or more acts of the series of acts 700 in addition to or alternatively to one or more acts described in conjunction with other figures. While FIG. 7 illustrates acts according to a respective embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 702 of detecting a transportation request. In particular, the act 702 can involve detecting a transportation request transmitted from a mobile device of a requestor, wherein the transportation request comprises a selected drop-off location.

As further shown in FIG. 7, the series of acts 700 includes an act 704 of transmitting instructions for transportation based on the transportation request. In particular, the act 702 can involve transmitting instructions to a mobile device of a transportation provider for transportation of the requestor to the selected drop-off location.

As shown in FIG. 7, the series of acts 700 also includes an act 706 of analyzing information associated with the transportation. In particular, the act 702 can involve analyzing transportation signals based on data received from at least one of the mobile device of the requestor or the mobile device of the transportation provider.

As further shown in FIG. 7, the series of acts 700 includes an act 708 of detecting a transportation irregularity. For example, the act 708 can include detecting, based on the analyzed information, an unexpected drop-off, a long drop-off, a physical altercation, or other irregularity reflecting an emergency or safety incident.

As shown in FIG. 7, the series of acts 700 also includes an act 710 of providing an emergency assistance user. In particular, the act 702 can involve, in response to detecting the transportation irregularity, transmitting instructions to a mobile device to display an emergency assistance user interface that is customized based on the specific information associated with the potential emergency. In one or more additional embodiments, the series of acts 700 includes configuring and sending an emergency communication to a remote third-party system. Additionally, the series of acts 700 can include, in response to receiving an indication of an interaction with at least one selectable emergency option: determining a current location of the mobile device of the requestor and configuring an emergency communication instructing a remote third-party system to dispatch emergency services to the current location of the mobile device of the requestor.

In one or more embodiments, the series of acts 700 includes calculating, based on analyzing the information and in association with the transportation irregularity, an emergency score representing a severity of a transportation irregularity. Additionally, in at least one embodiment, the series of acts 700 includes, in response to determining that the mobile device of a requestor is displaying the emergency assistance user interface, initiating a countdown associated with the at least one selectable emergency option, and in response to determining that the countdown has expired, configuring an emergency communication instructing a remote third-party system to dispatch emergency services to the current location of the mobile device.

In at least one embodiment, the series of acts 700 further includes transmitting instructions to the mobile device of the requestor to display a push notification associated with a detected transportation irregularity; and wherein transmitting instructions to the mobile device of the requestor to display the emergency assistance user interface is in response to a detected interaction with the push notification.

In one or more embodiments, the series of acts 700 further include: initiating a communication session with the remote third-party system by sending the emergency communication to the remote third-party system; monitoring the mobile device of the requestor and the mobile device of the transportation provider for updated information; providing the updated information to the remote third-party system; and receiving one or more updates from the remote third-party system associated with at least one of the mobile device of the requestor or the mobile device of the transportation provider. In at least one embodiment, the series of acts 700 includes determining, after a second threshold amount of time, whether a user interaction in connection with the emergency assistance user interface has been detected; and based on the determination, transmitting instructions to the mobile device of the requestor to display a push notification associated with the transportation irregularity.

Figure 8:
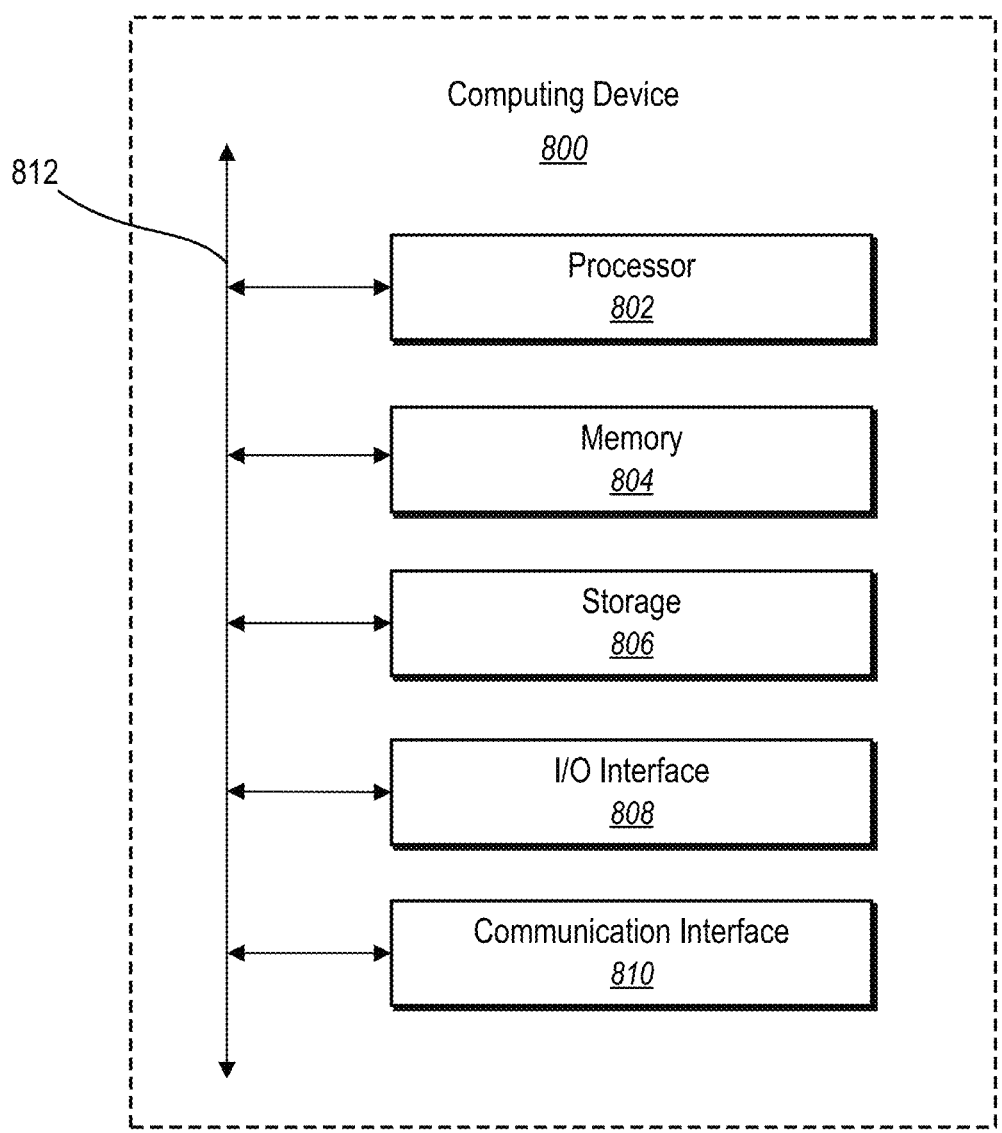
FIG. 8 illustrates a block diagram of an example computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the computing system 800, the server(s) 102, the requestor client device 116, the provider client device 110). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination of these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

Figure 9:
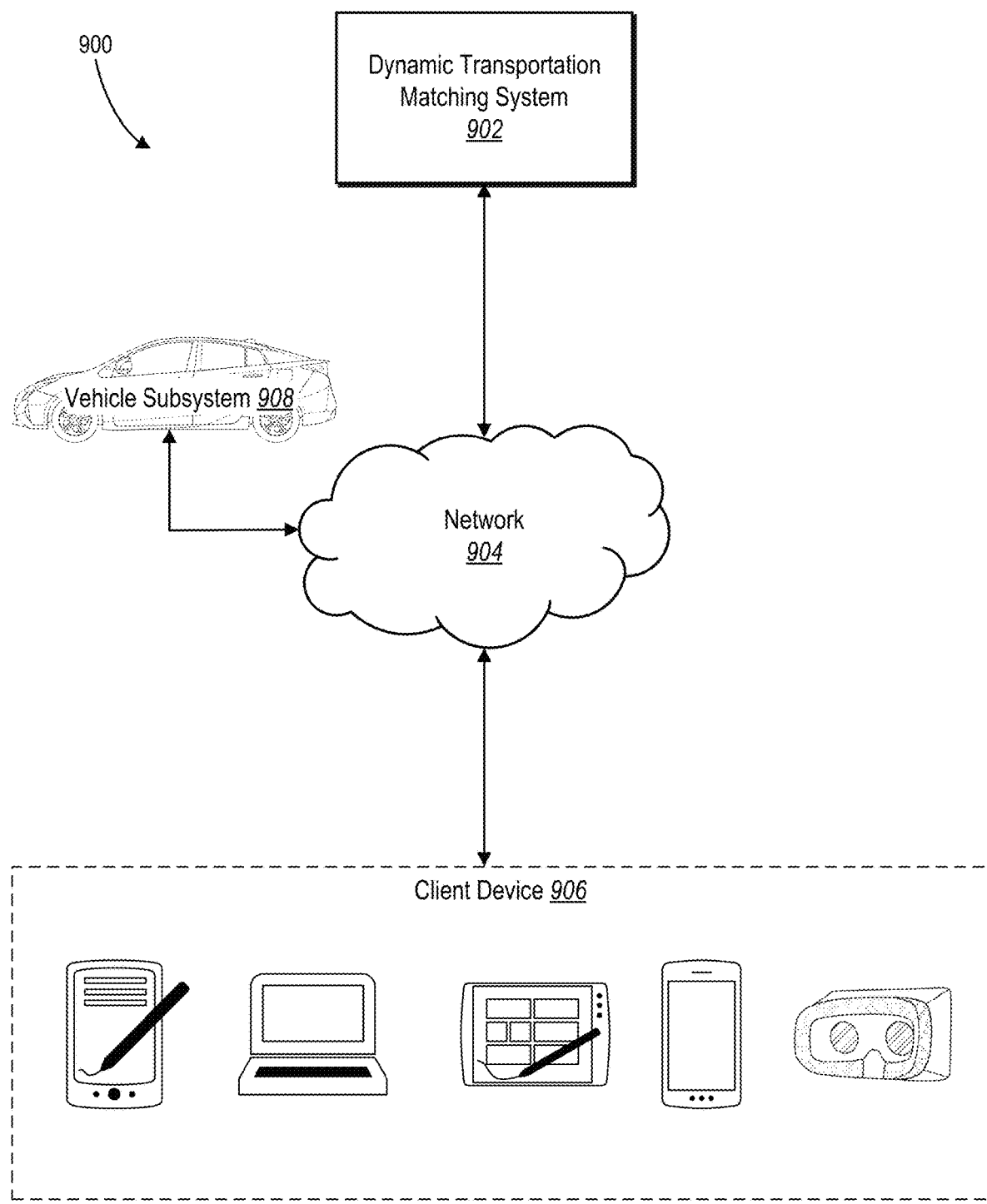
FIG. 9 illustrates an example network environment of a dynamic transportation matching system in accordance with one or more embodiments.

FIG. 9 illustrates an example network environment 900 of a dynamic transportation matching system (e.g., the dynamic transportation matching system 104). The network environment 900 includes a client device 906, a dynamic transportation matching system 902, and a vehicle subsystem 908 connected to each other by a network 904. Although FIG. 9 illustrates a particular arrangement of the client device 906, the dynamic transportation matching system 902, the vehicle subsystem 908, and the network 904, this disclosure contemplates any suitable arrangement of the client device 906, the dynamic transportation matching system 902, the vehicle subsystem 908, and the network 904. As an example, and not by way of limitation, two or more of the client devices 906, the dynamic transportation matching system 902, and the vehicle subsystem 908 communicate directly, bypassing the network 904. As another example, two or more of the client devices 906, the dynamic transportation matching system 902, and the vehicle subsystem 908 may be physically or logically co-located with each other in whole or in part. Moreover, although FIG. 9 illustrates a particular number of the client devices 906, the dynamic transportation matching systems 902, the vehicle subsystems 908, and the networks 904, this disclosure contemplates any suitable number of the client devices 906, the dynamic transportation matching systems 902, the vehicle subsystems 908, and the networks 904. As an example, and not by way of limitation, the network environment 900 may include multiple client devices 906, the dynamic transportation matching systems 902, the vehicle subsystems 908, and the networks 904.

This disclosure contemplates any suitable network 904. As an example, and not by way of limitation, one or more portions of the network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 904 may include one or more networks 904.

Links may connect the client device 906, the dynamic transportation matching system 902, and the vehicle subsystem 908 to the communication network 904 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by the client device 906. As an example, and not by way of limitation, a client device 906 may include any of the computing devices discussed above in relation to FIG. 9. A client device 906 may enable a network user at the client device 906 to access a network. A client device 906 may enable its user to communicate with other users at other client devices 906.

In particular embodiments, the client device 906 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. The client device 906 may render a webpage based on the HTML files from the server for presentation to the user. This disclosure contemplates any suitable webpage files. As an example, and not by way of limitation, webpages may render from HTML files, Extensible HyperText Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the dynamic transportation matching system 902 may be a network-addressable computing system that can host a rideshare transportation network. The dynamic transportation matching system 902 may generate, store, receive, and send data, such as, for example, user-profile data, concept-profile data, text data, ride request data, GPS location data, provider data, requestor data, vehicle data, or other suitable data related to the rideshare transportation network. This may include authenticating the identity of providers and/or vehicles who are authorized to provide ride services through the dynamic transportation matching system 902. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the dynamic transportation matching system 902 may manage ride matching services to connect a user/requestor with a vehicle and/or provider. By managing the ride matching services, the dynamic transportation matching system 902 can manage the distribution and allocation of vehicle subsystem resources and user resources such as GPS location and availability indicators, as described herein.

The dynamic transportation matching system 902 may be accessed by the other components of the network environment 900 either directly or via network 904. In particular embodiments, the dynamic transportation matching system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the dynamic transportation matching system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or a dynamic transportation matching system 902 to manage, retrieve, modify, add, or delete, the information stored in data stores.

In particular embodiments, the dynamic transportation matching system 902 may provide users with the ability to take actions on various types of items or objects, supported by the dynamic transportation matching system 902. As an example, and not by way of limitation, the items and objects may include rideshare networks to which users of the dynamic transportation matching system 902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 902 or by an external system of a third-party system, which is separate from the dynamic transportation matching system 902 and coupled to the dynamic transportation matching system 902 via a network 904.

In particular embodiments, the dynamic transportation matching system 902 may be capable of linking a variety of entities. As an example, and not by way of limitation, the dynamic transportation matching system 902 may enable users to interact with each other or other entities, or to allow users to interact with these entities through an application programming interfaces (API) or other communication channels.

In particular embodiments, the dynamic transportation matching system 902 may include a variety of servers, sub-systems, programs, modules, logs, and data stores. In particular embodiments, the dynamic transportation matching system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The dynamic transportation matching system 902 may also include suitable components such as network interfaces, security mechanisms, load balancers, failover servers, management-and-network-operations consoles, other suitable components, or any suitable combination thereof. In particular embodiments, the dynamic transportation matching system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the dynamic transportation matching system 902 and one or more client devices 906. An action logger may be used to receive communications from a web server about a user's actions on or off the dynamic transportation matching system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from the client device 906 responsive to a request received from the client device 906. Authorization servers may be used to enforce one or more privacy settings of the users of the dynamic transportation matching system 902. A privacy setting of a user determines how particular information associated with a user can be shared. The authorization server may allow users to opt in to or opt out of having their actions logged by the dynamic transportation matching system 902 or shared with other systems, such as, for example, by setting appropriate privacy settings. Third-party-content-object stores may be used to store content objects received from third parties. Location stores may be used for storing location information received from the client devices 906 associated with users.

In addition, the vehicle subsystem 908 can include a human-operated vehicle or an autonomous vehicle. A provider of a human-operated vehicle can perform maneuvers to pick up, transport, and drop-off one or more requestors according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

In particular embodiments, the vehicle subsystem 908 may include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop-off a requestor.

In particular embodiments, the vehicle subsystem 908 may include a communication device capable of communicating with the client device 906 and/or the dynamic transportation matching system 902. For example, the vehicle subsystem 908 can include an on-board computing device communicatively linked to the network 904 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   at least one non-transitory computer-readable storage medium storing instructions thereon that, when executed by the at least one processor, cause the system to:
   detect a transportation request transmitted from a requestor mobile device of a requestor;
   transmit instructions to a driver mobile device corresponding to a transportation vehicle for transportation of the requestor to a selected drop-off location;
   detect a transportation irregularity associated with the transportation request by analyzing digital signals received from at least one of the requestor mobile device or the driver mobile device to determine that the transportation vehicle has remained at an additional location different from the selected drop-off location for a threshold amount of time;
   calculate, based on analyzing the digital signals, an emergency score associate with the transportation irregularity; and
   in response to detecting the transportation irregularity and based on determining that the emergency score satisfies a predetermined threshold, transmit instructions to at least one of the requestor mobile device or the driver mobile device to display an emergency assistance user interface comprising at least one selectable emergency assistance option.

2. The system as recited in claim 1, further storing instructions that, when executed by the at least one processor, cause the system to:
   transmit instructions to the driver mobile device or the requestor mobile device to display a push notification associated with the detected transportation irregularity; and
   wherein the display of the emergency assistance user interface is in response to a detected interaction with the push notification.

3. The system as recited in claim 1, further storing instructions that, when executed by the at least one processor, cause the system to:
   in response to receiving an indication of a detected selection of the at least one selectable emergency assistance option:
   configure an emergency communication instructing a remote third-party system to contact the requestor mobile device or the driver mobile device; or
   determine a current location of the requestor mobile device or the driver mobile device; and
   configure an emergency communication instructing a remote third-party system to dispatch emergency services to the current location of the requestor mobile device or the driver mobile device.

4. The system as recited in claim 3, further storing instructions that, when executed by the at least one processor, cause the system to:

monitor the requestor mobile device or the driver mobile device for updated information;

provide the updated information to the remote third-party system; and receive one or more updates from the remote third-party system associated with at least one of the requestor mobile device or the driver mobile device.

5. The system as recited in claim 1, further storing instructions that, when executed by the at least one processor, cause the system to initiate a countdown within the emergency assistance user interface.

6. The system as recited in claim 5, further storing instructions that, when executed by the at least one processor, cause the system to:

in response to determining that the countdown has expired, configure an emergency communication instructing a remote third-party system to dispatch emergency services to a current location of the requestor mobile device or the driver mobile device.

7. The system as recited in claim 5, further storing instructions that, when executed by at least one processor, cause the system to, in response determining that the emergency score satisfies a threshold from a plurality of thresholds, customize the emergency assistance user interface by selecting the at least one selectable emergency assistance option to display from a plurality of selectable emergency assistance options.

8. A method comprising:

detecting a transportation request transmitted from a requestor mobile device of a requestor;

transmitting instructions to a driver mobile device corresponding to a transportation vehicle for transportation of the requestor to a selected drop-off location;

detecting a transportation irregularity associated with the transportation request by analyzing digital signals received from at least one of the requestor mobile device or the driver mobile device to determine that the transportation vehicle has remained at an additional location different from the selected drop-off location for a threshold amount of time;

calculating, based on analyzing the digital signals, an emergency score associate with the transportation irregularity; and in response to detecting the transportation irregularity and based on determining that the emergency score satisfies a predetermined threshold, transmitting instructions to at least one of the requestor mobile device or the driver mobile device to display an emergency assistance user interface comprising at least one selectable emergency assistance option.

9. The method as recited in claim 8, further comprising, prior to transmitting the instructions:

transmitting initial instructions to the requestor mobile device or the driver mobile device to display a push notification associated with the detected transportation irregularity; and wherein the display of the emergency assistance user interface is in response to a detected interaction with the push notification.

10. The method as recited in claim 8, further comprising, in response to receiving an indication of a detected selection of the at least one selectable emergency assistance option:

configuring an emergency communication instructing a remote third-party system to contact the requestor mobile device or the driver mobile device; or determining a current location of the requestor mobile device or the driver mobile device; and configuring an emergency communication instructing a remote third-party system to dispatch emergency services to the current location of the requestor mobile device or the driver mobile device.

11. The method as recited in claim 10, further comprising:

initiating a communication session with the remote third-party system by sending the emergency communication to the remote third-party system;

monitoring the requestor mobile device or the driver mobile device for updated information;

providing the updated information to the remote third-party system; and receiving one or more updates from the remote third-party system associated with at least one of the requestor mobile device or the driver mobile device.

12. The method as recited in claim 8, further comprising initiating a countdown within the emergency assistance user interface.

13. The method as recited in claim 12, further comprising:

in response to determining that the countdown has expired, configuring an emergency communication instructing a remote third-party system to dispatch emergency services to a current location of the requestor mobile device or the driver mobile device.

14. The method as recited in claim 12, further comprising, in response determining that the emergency score satisfies a particular threshold from a plurality of thresholds, customizing the emergency assistance user interface by selecting the at least one selectable emergency assistance option to display from a plurality of selectable emergency assistance options.

15. A non-transitory computer-readable medium storing instructions thereon that, when executed by at least one processor, cause a computer system to:

detect a transportation request transmitted from a requestor mobile device of a requestor;

transmit instructions to a driver mobile device corresponding to a transportation vehicle for transportation of the requestor to a selected drop-off location;

detect a transportation irregularity associated with the transportation request by analyzing digital signals received from at least one of the requestor mobile device or the driver mobile device to determine that the transportation vehicle has remained at an additional location different from the selected drop-off location for a threshold amount of time;

calculate, based on analyzing the digital signals, an emergency score associate with the transportation irregularity; and in response to detecting the transportation irregularity and based on determining that the emergency score satisfies a predetermined threshold, transmit instructions to at least one of the requestor mobile device or the driver mobile device to display an emergency assistance user interface comprising at least one selectable emergency assistance option.

16. The non-transitory computer-readable medium as recited in claim 15, further storing instructions thereon that, when executed by the at least one processor, cause the computer system to:
- transmit instructions to the requestor mobile device or the driver mobile device to display a push notification associated with the detected transportation irregularity; and
- wherein the display of the emergency assistance user interface is in response to a detected interaction with the push notification.

17. The non-transitory computer-readable medium as recited in claim 15, further storing instructions thereon that, when executed by the at least one processor, cause the computer system to, in response to receiving an indication of a detected selection of the at least one selectable emergency assistance option:
- configure an emergency communication instructing a remote third-party system to contact the requestor mobile device or the driver mobile device; or
- determine a current location of the requestor mobile device or the driver mobile device; and
- configure an emergency communication instructing a remote third-party system to dispatch emergency services to the current location of the requestor mobile device or the driver mobile device.

18. The non-transitory computer-readable medium as recited in claim 17, further storing instructions thereon that, when executed by the at least one processor, cause the computer system to:
- monitor the requestor mobile device and the driver mobile device for updated information;
- provide the updated information to the remote third-party system; and
- receive one or more updates from the remote third-party system associated with at least one of the requestor mobile device or the driver mobile device.

19. The non-transitory computer-readable medium as recited in claim 15, further storing instructions thereon that, when executed by the at least one processor, cause the computer system to initiate a countdown within the emergency assistance user interface.

20. The non-transitory computer-readable medium as recited in claim 19, further storing instructions thereon that, when executed by the at least one processor, cause the computer system to:
- in response to determining that the countdown has expired, configure an emergency communication instructing a remote third-party system to dispatch emergency services to a current location of the requestor mobile device or the driver mobile device.

* * * * *